Nov. 4, 1952  M. S. CURTIS  2,616,159
MACHINE TOOL
Filed June 4, 1947  17 Sheets-Sheet 1
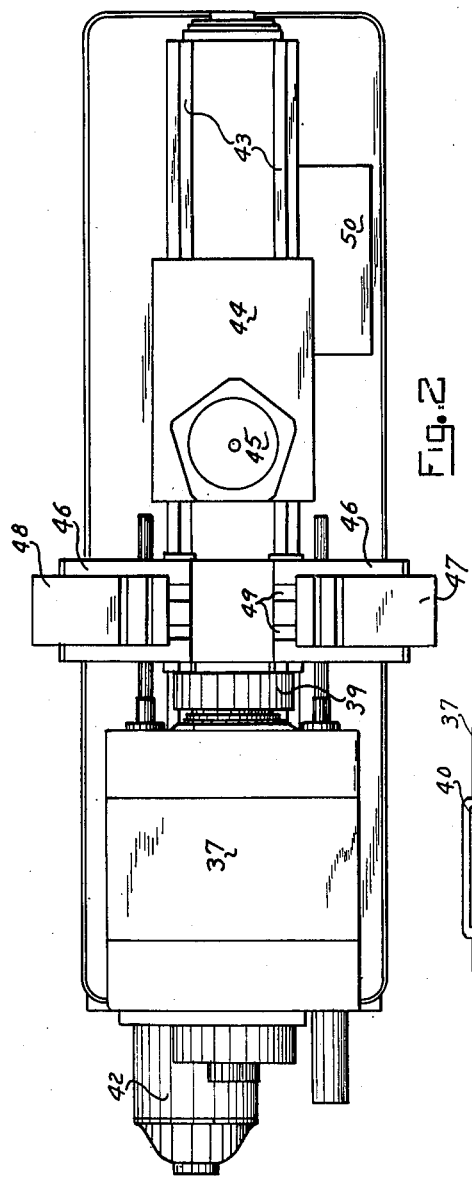
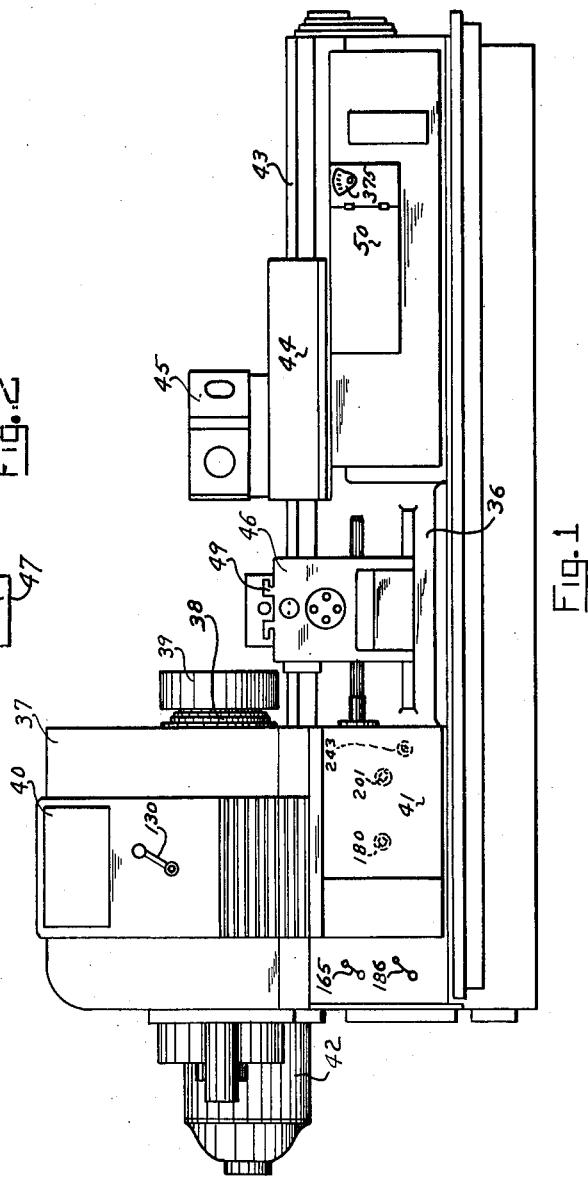
INVENTOR.
MYRON S. CURTIS
BY
Kwis, Hudson, Boughton & Williams
ATTORNEYS Nov. 4, 1952  M. S. CURTIS  2,616,159
MACHINE TOOL
Filed June 4, 1947  17 Sheets-Sheet 2
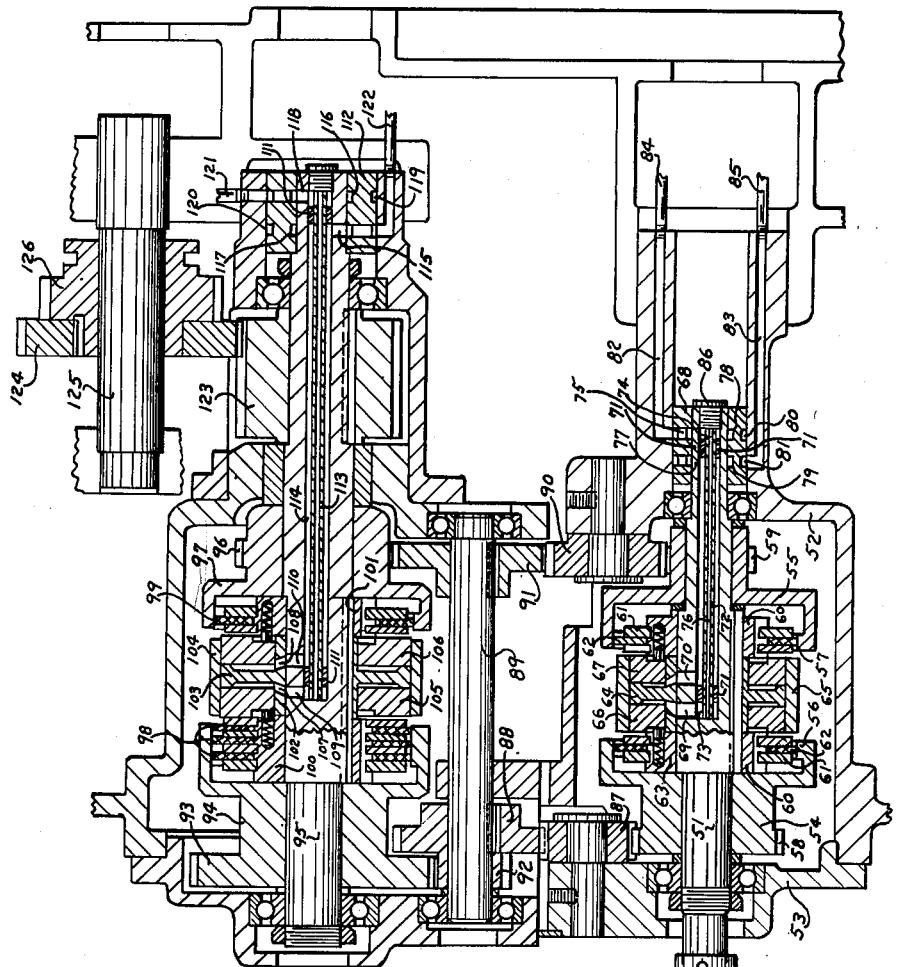
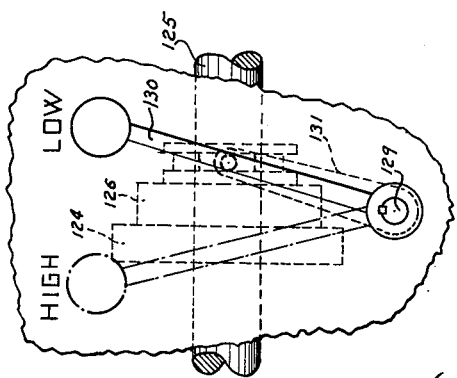
INVENTOR.
MYRON S. CURTIS
BY
Kwis, Hudson, Boughton & Williams
ATTORNEYS Nov. 4, 1952 M. S. CURTIS 2,616,159
MACHINE TOOL
Filed June 4, 1947 17 Sheets-Sheet 3
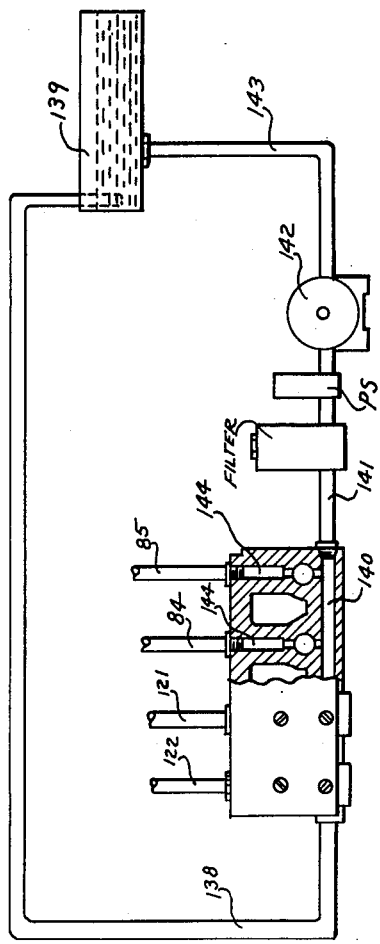
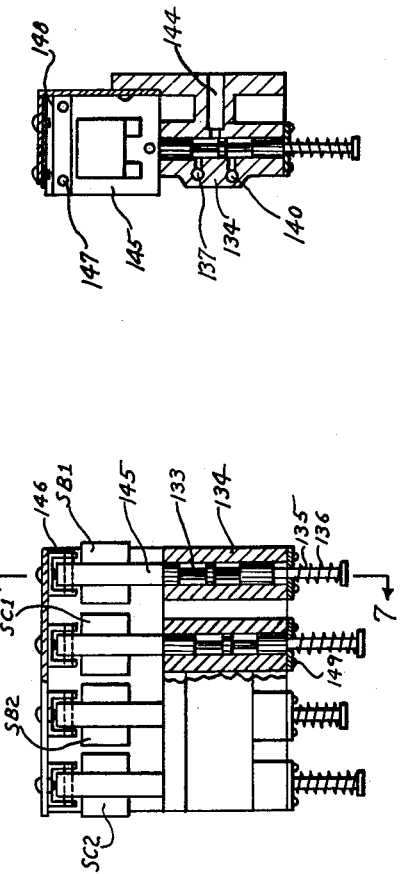
INVENTOR.
MYRON S. CURTIS
BY
Kwis, Hudson, Boughton & Williams
ATTORNEYS

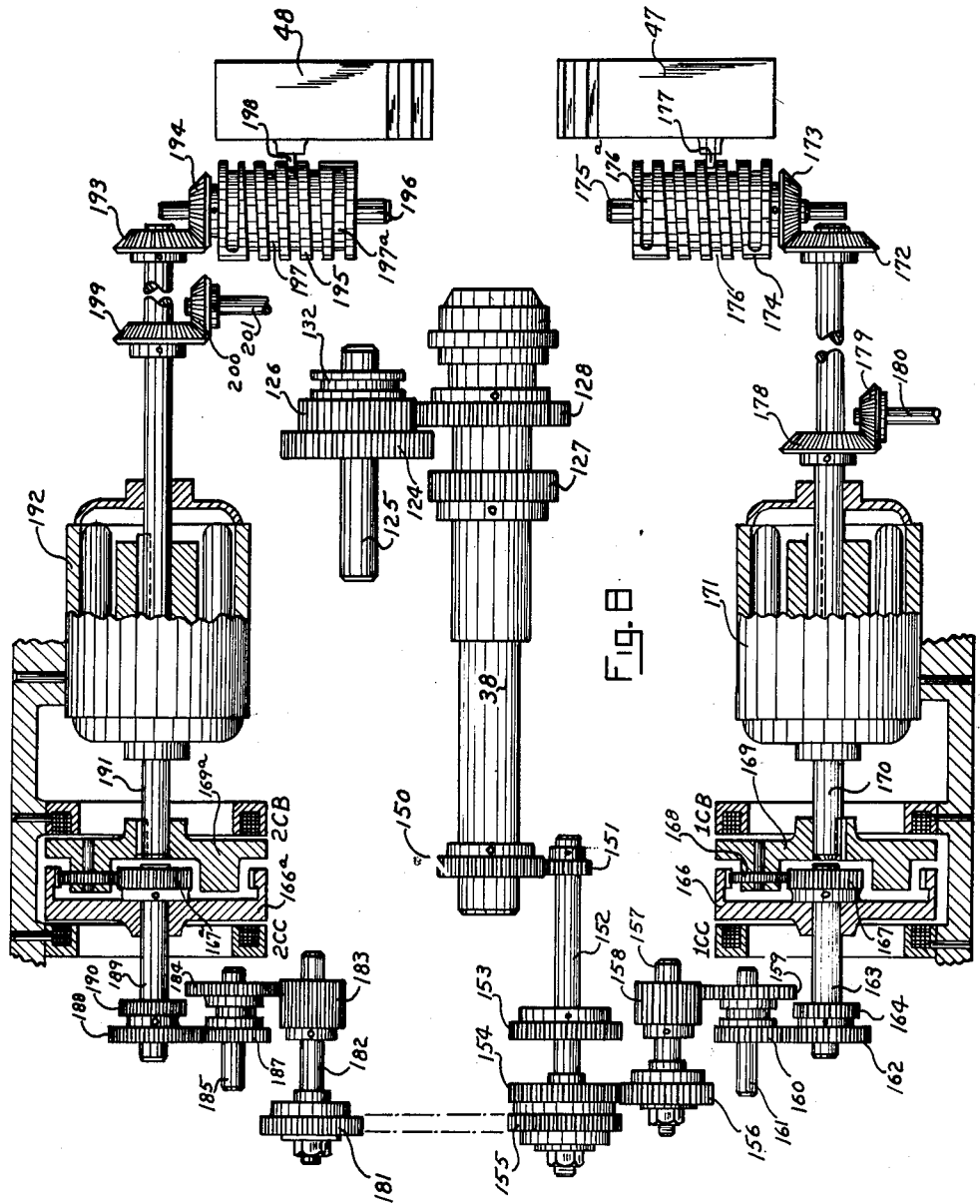

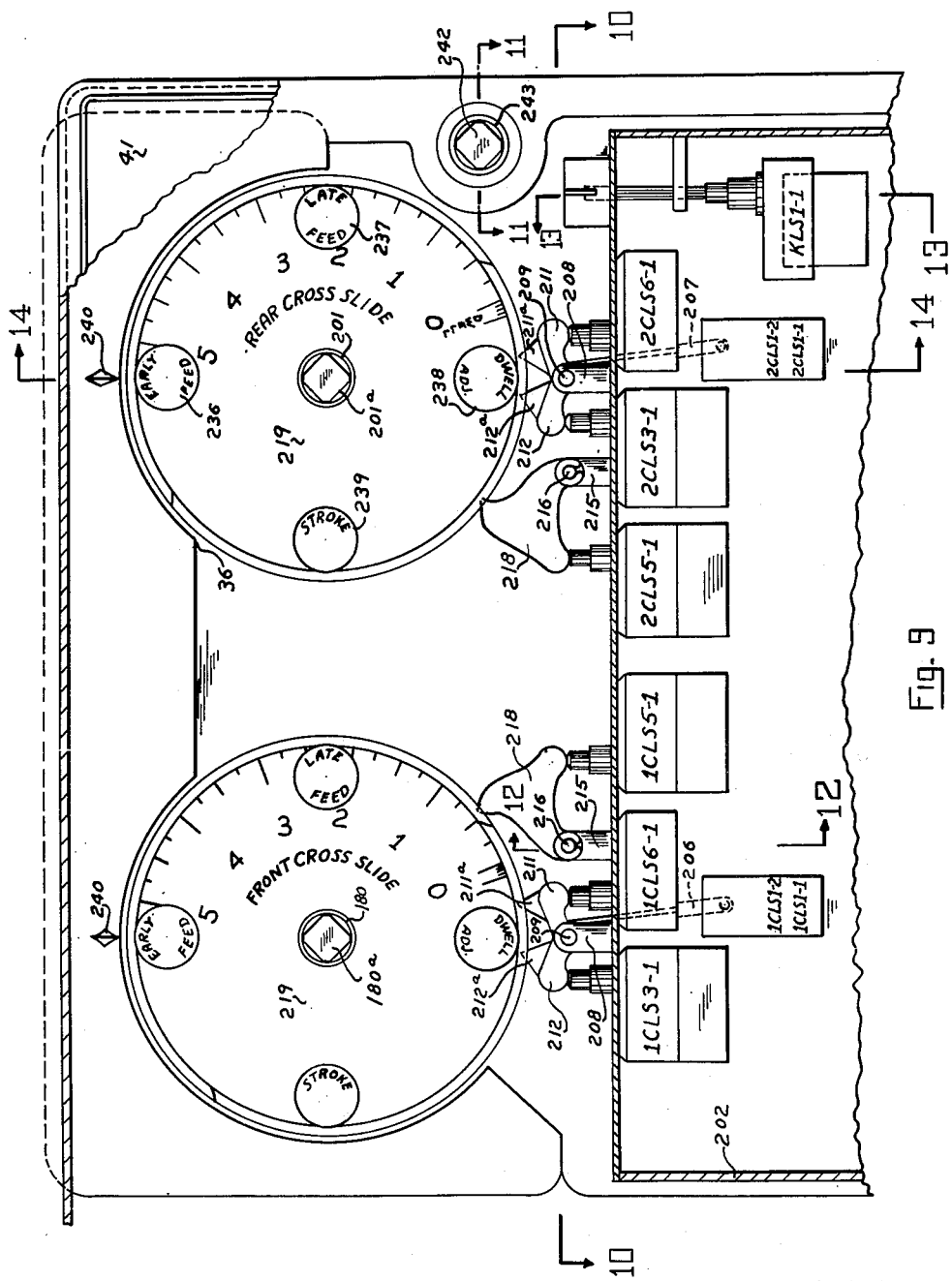

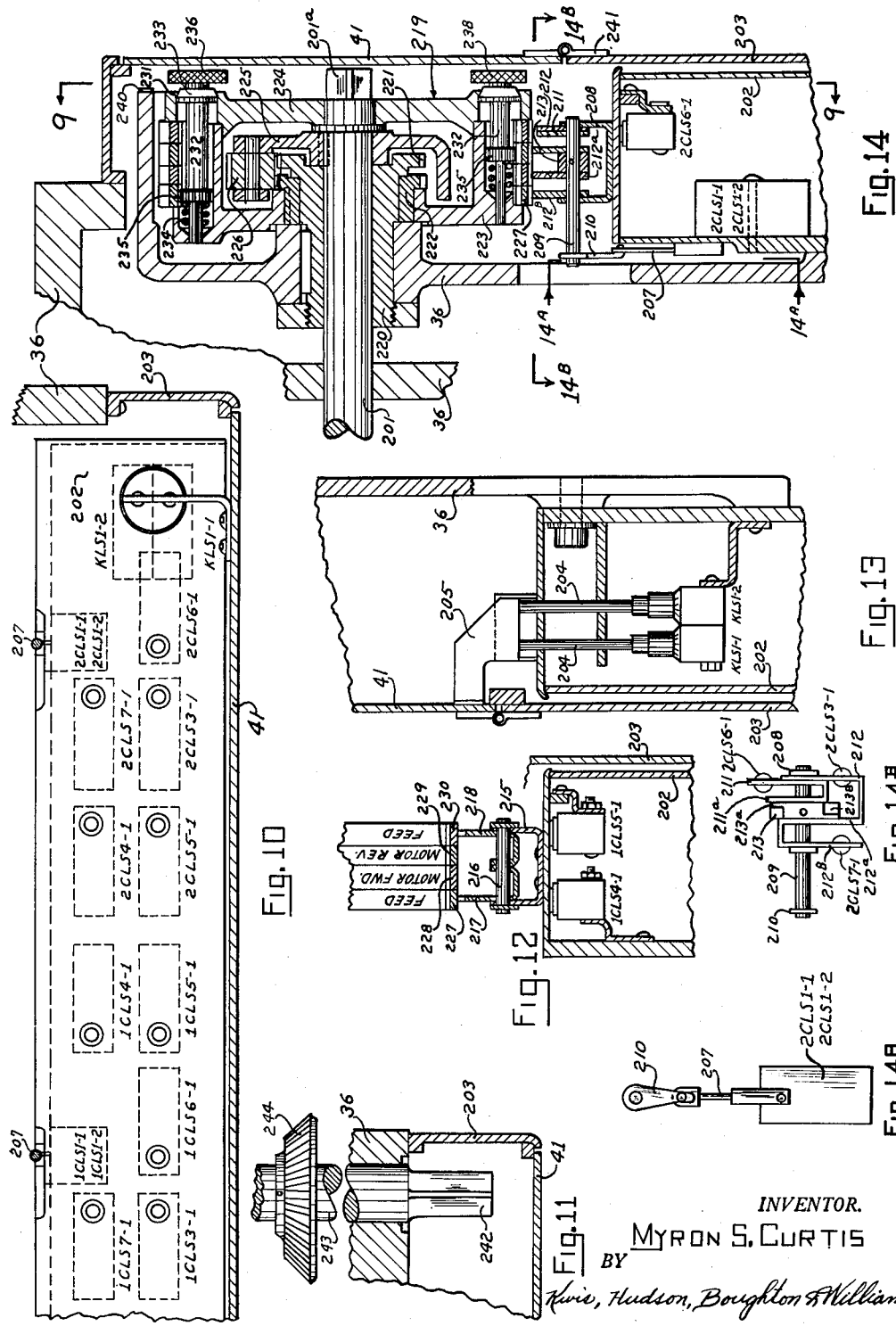

Nov. 4, 1952  M. S. CURTIS  2,616,159
MACHINE TOOL
Filed June 4, 1947  17 Sheets-Sheet 7

INVENTOR.
MYRON S. CURTIS
BY
Kwis, Hudson, Boughton & Williams
ATTORNEYS

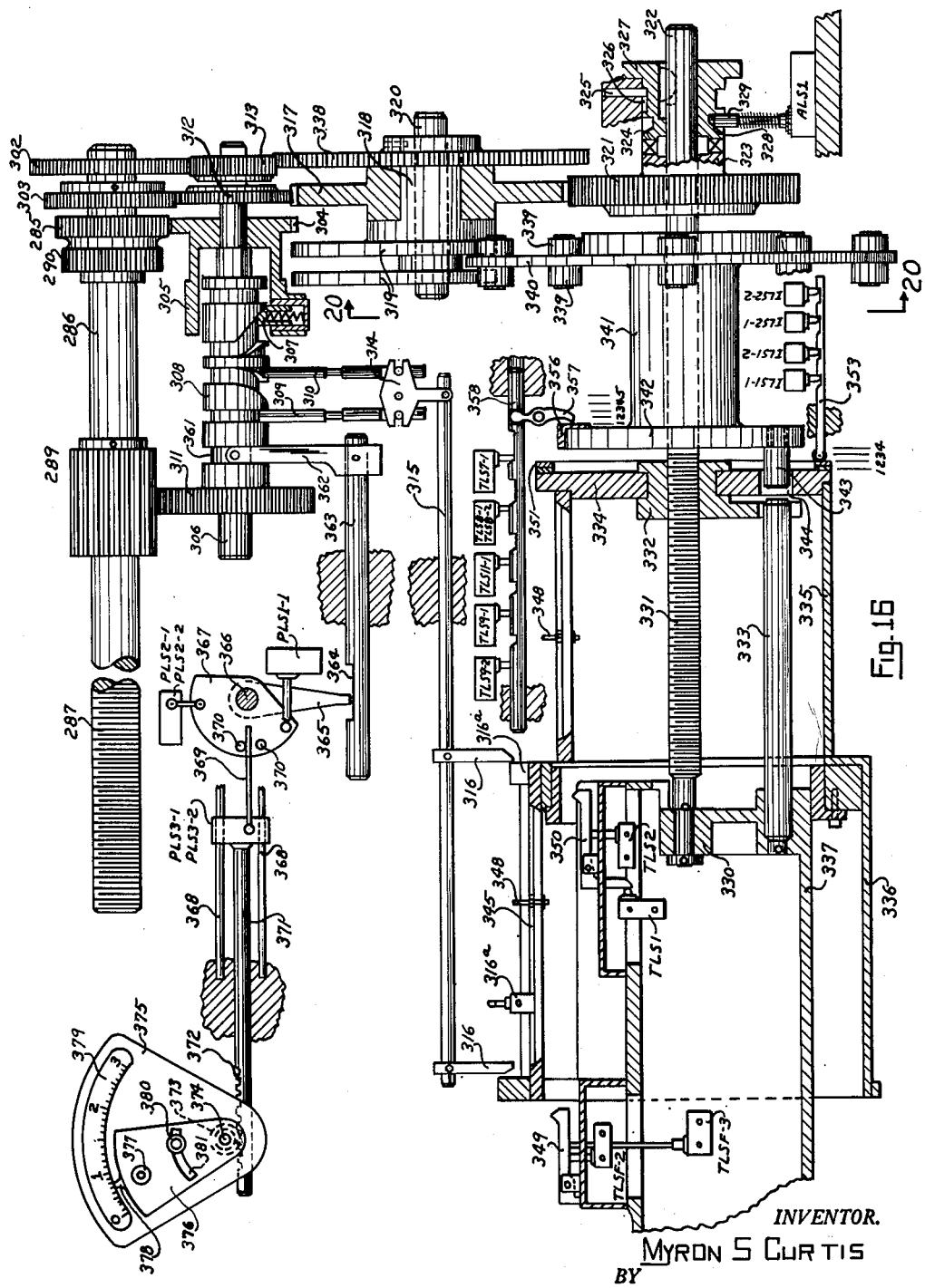

Nov. 4, 1952  M. S. CURTIS  2,616,159
MACHINE TOOL
Filed June 4, 1947  17 Sheets-Sheet 9
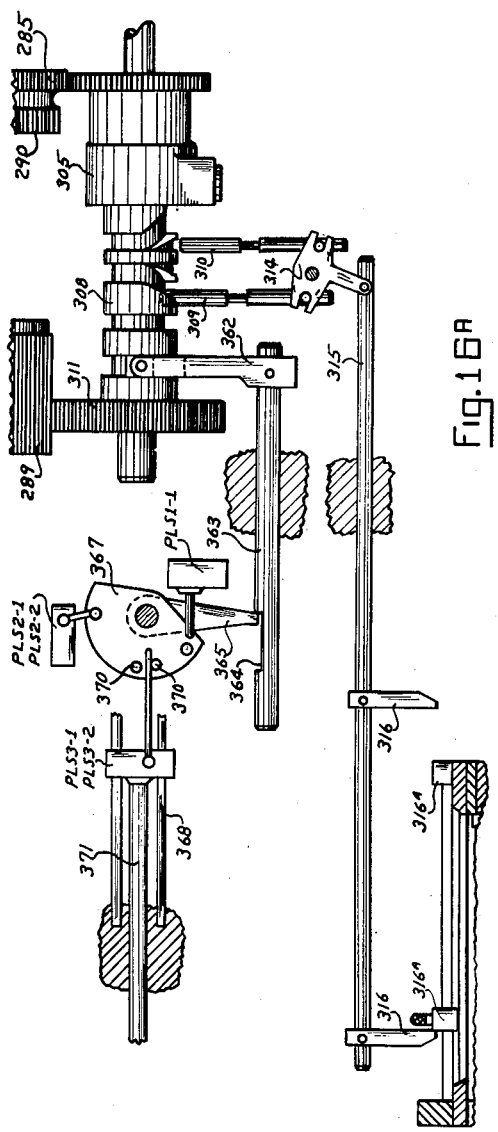
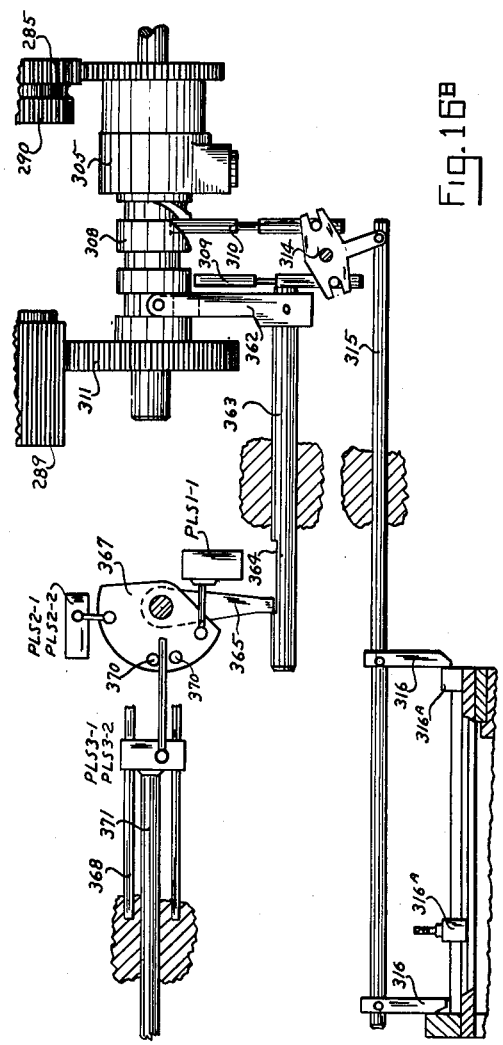
INVENTOR.
MYRON S. CURTIS
BY
Kwis, Hudson, Boughton & Williams
ATTORNEYS

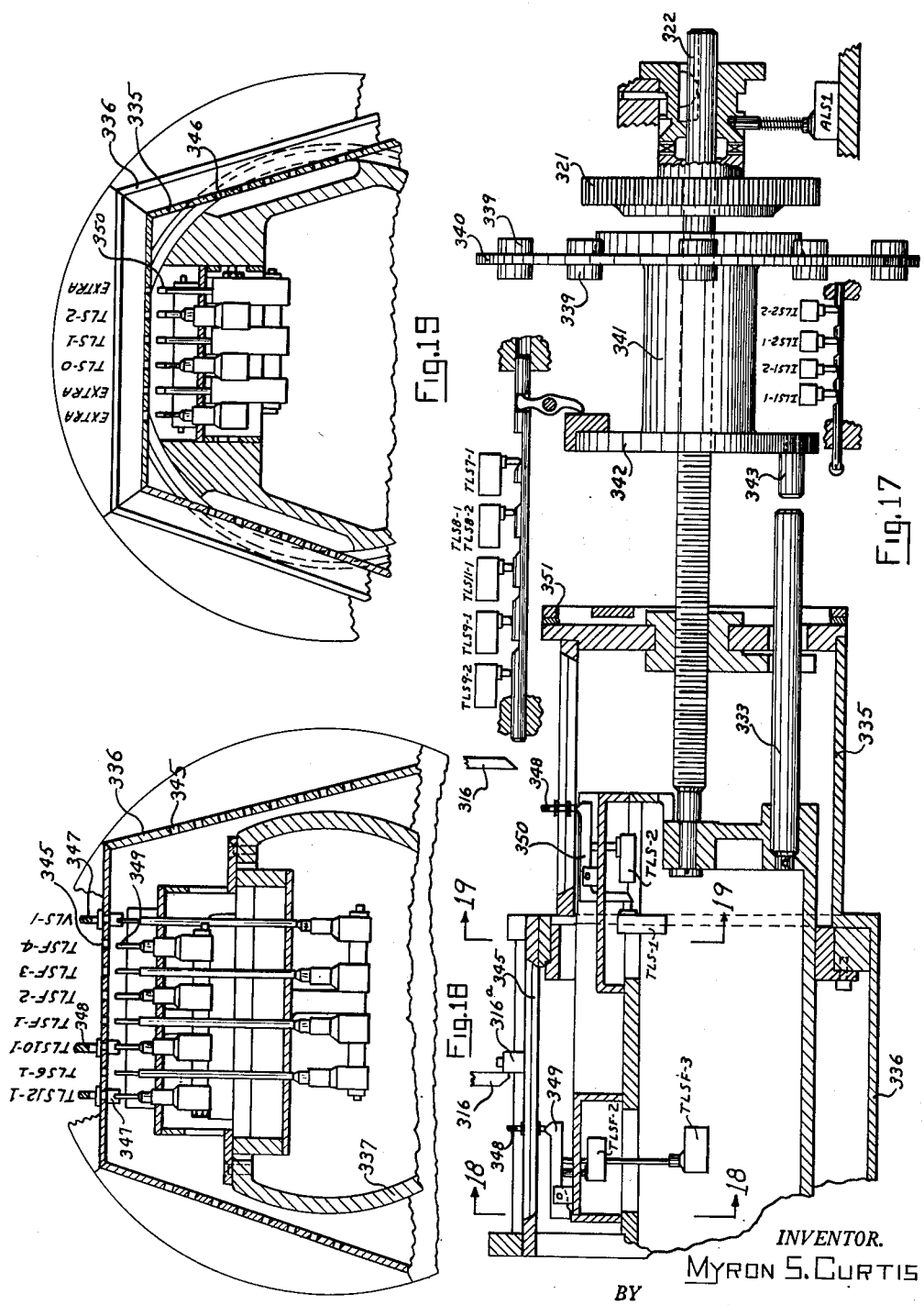

Nov. 4, 1952　　　　　　M. S. CURTIS　　　　　　2,616,159
MACHINE TOOL
Filed June 4, 1947　　　　　　　　　　　　17 Sheets-Sheet 11
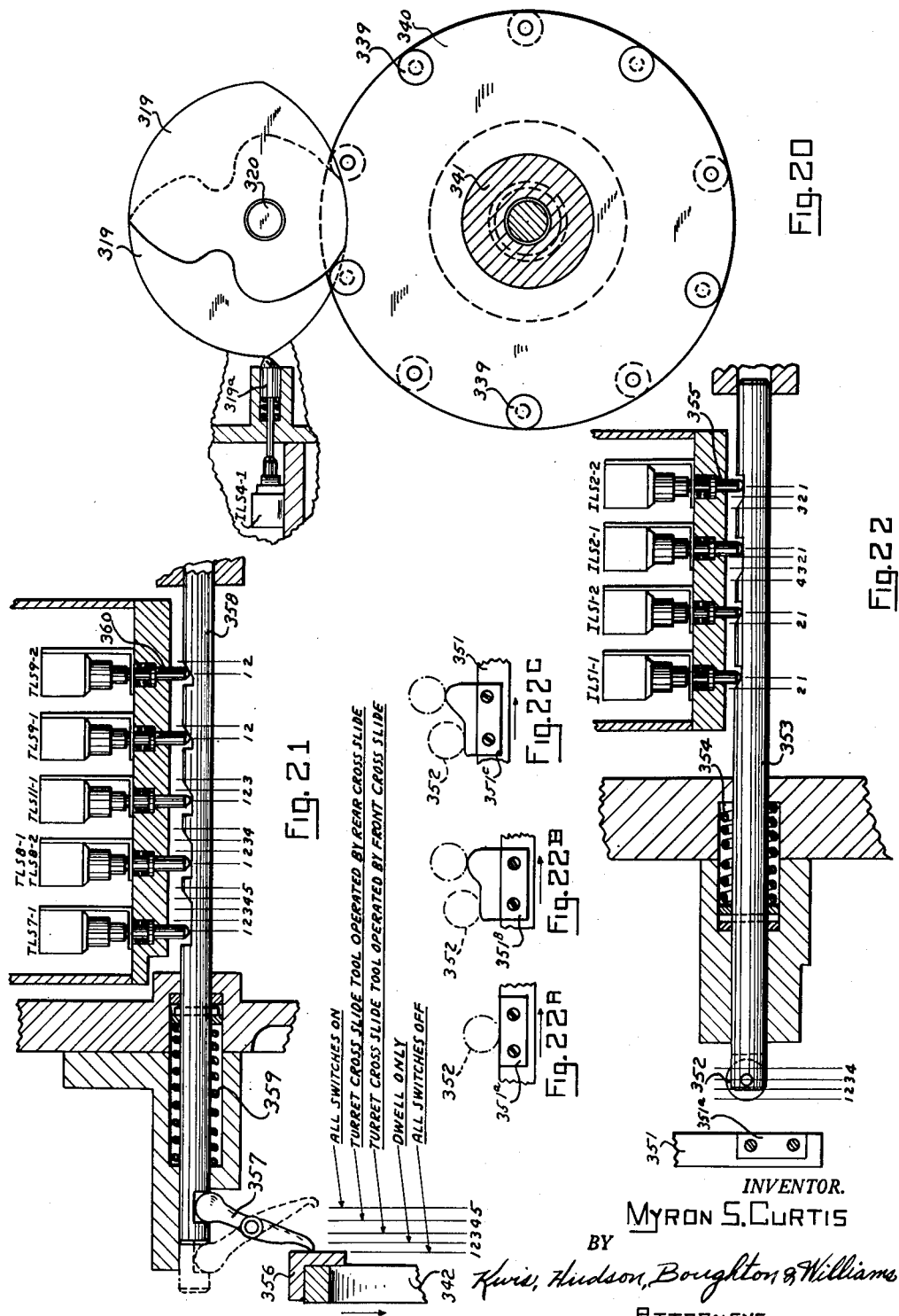
INVENTOR.
MYRON S. CURTIS
BY
Kwis, Hudson, Boughton & Williams
ATTORNEYS Nov. 4, 1952     M. S. CURTIS     2,616,159
MACHINE TOOL
Filed June 4, 1947     17 Sheets-Sheet 12
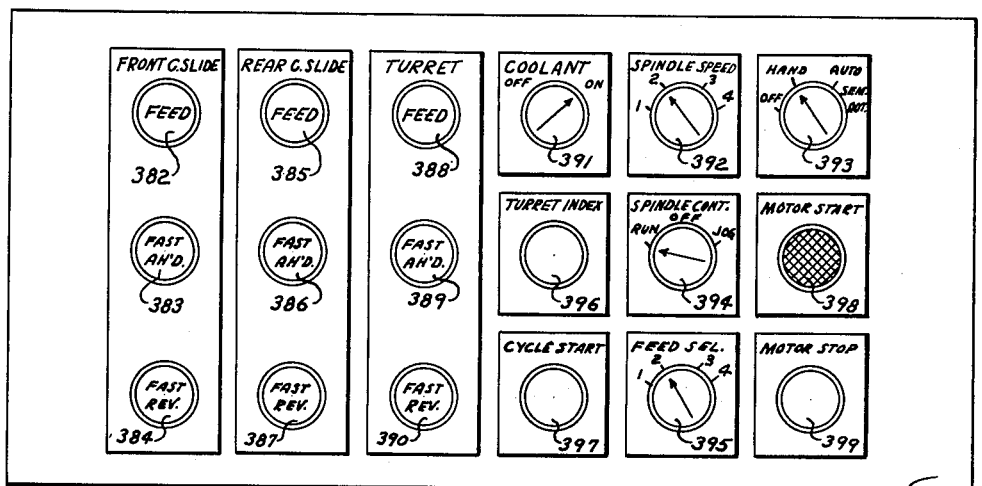
Fig. 23
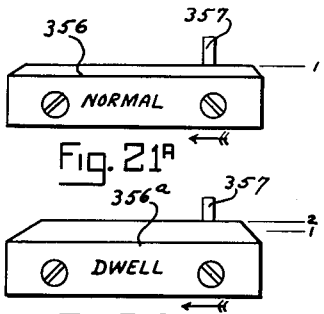
Fig. 21A
Fig. 21B
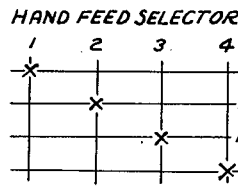
Fig. 25
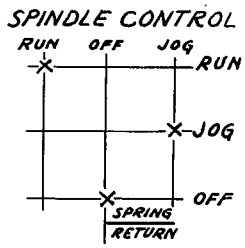
Fig. 27
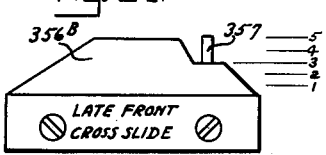
Fig. 21C
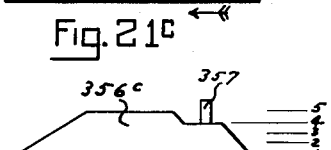
Fig. 21D
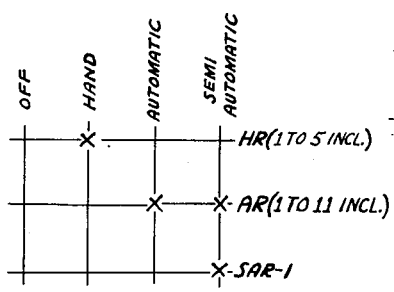
Fig. 26
Fig. 24
INVENTOR.
MYRON S. CURTIS
BY
Kwis, Hudson, Boughton & Williams
ATTORNEYS

INVENTOR.
MYRON S. CURTIS

Nov. 4, 1952          M. S. CURTIS          2,616,159
MACHINE TOOL

Filed June 4, 1947          17 Sheets-Sheet 15

INVENTOR.
Myron S. Curtis
BY
Kwis, Hudson, Boughton & Williams
ATTORNEYS

Nov. 4, 1952 — M. S. CURTIS — 2,616,159
MACHINE TOOL
Filed June 4, 1947 — 17 Sheets-Sheet 16

Fig. 31

INVENTOR.
MYRON S. CURTIS
BY
Kwis, Hudson, Boughton & Williams
ATTORNEYS

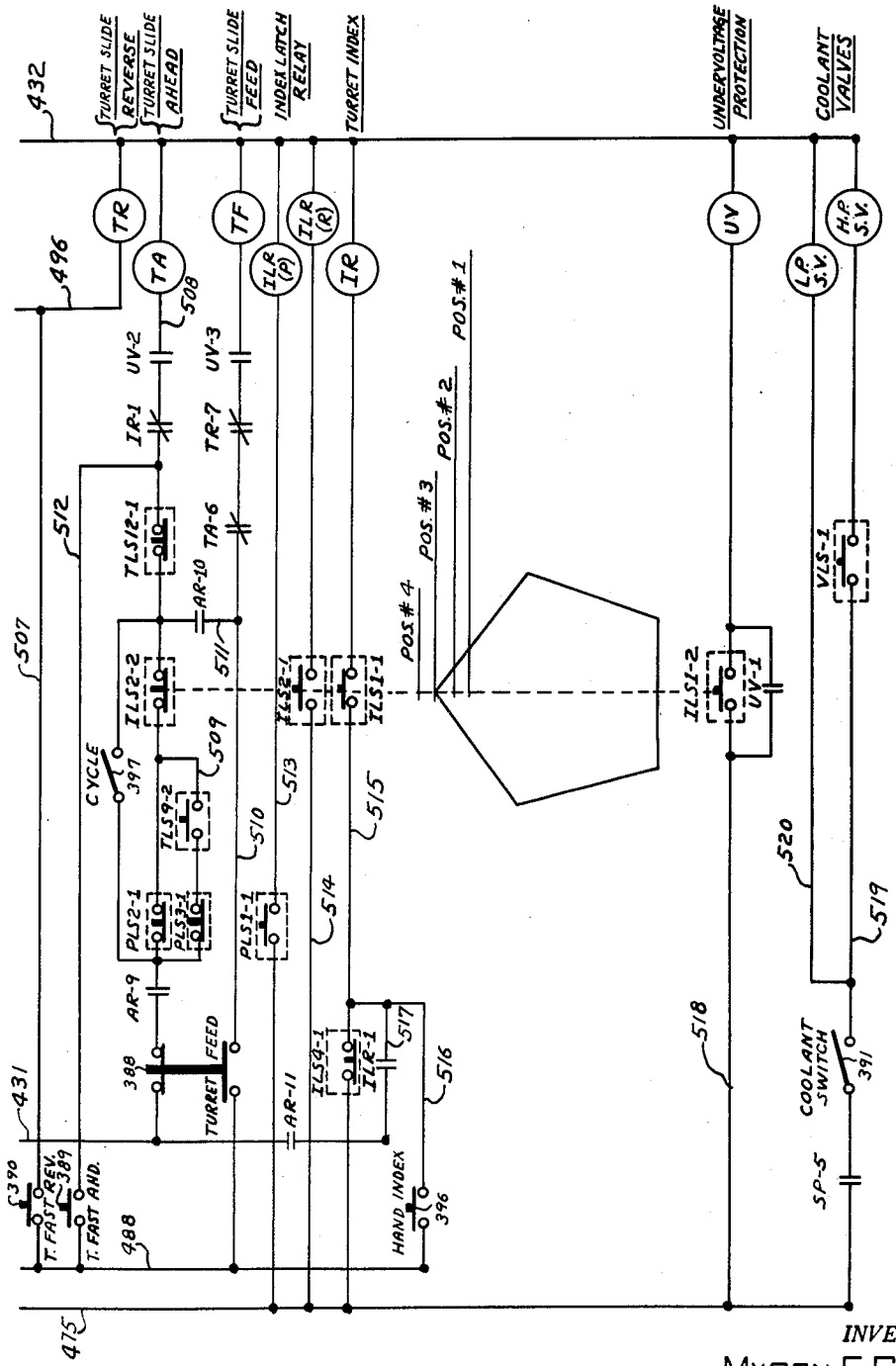

Patented Nov. 4, 1952

2,616,159

UNITED STATES PATENT OFFICE 2,616,159

MACHINE TOOL

Myron S. Curtis, Cleveland, Ohio, assignor to The Warner & Swasey Company, Cleveland, Ohio, a corporation of Ohio Application June 4, 1947, Serial No. 752,404

21 Claims. (Cl. 29—64)

This invention relates to a machine tool and more particularly to a turret lathe.

An object of the invention is to provide a machine tool such as a turret lathe and which is so constructed as to be readily set up for a wide variety of different machining operations in accordance with the work piece to be produced by the machine and which machine is capable of being operated manually, semi-automatically or automatically as desired.

Another object is to provide a machine tool having a work or tool spindle and a plurality of slides wherein the slides can be operated in timed relation to the spindle, either all simultaneously or in any desired sequence.

More specifically an object is to provide in a machine tool having a work or tool spindle and a plurality of slides, independent drive train units for said slides from said spindle, wherefore each slide can be moved independently of every other slide and at a different rate of movement or in any desired sequence or combination.

Another object of the invention is to provide a machine tool having a work or tool spindle and a plurality of slides wherein the mechanisms for controlling the speeds of the spindle and the movements of the slide are readily and easily adjusted to vary the speed of the spindle and rate of movements of the slides for different operations and are so located on the machine as to be readily accessible to the operator.

A further object is to provide in a machine tool having one or more slides, means for moving said slide or slides within the capacity of the machine, and with any desired part of the movement of the slide or slides constituting a feeding movement thereof.

Another object is to provide a machine tool having a plurality of slides, one of which is a turret slide having an indexible turret, and wherein the slides can operate with any or all indexed positions of the turret and in any desired sequence due to simple and readily obtainable adjustments of the control mechanism.

Another object is to provide in a machine tool having a plurality of slides, means for changing the sequence of operation of the slides without requiring the use of special parts such as special timing cams and the like and solely by means of simple adjustments of the control mechanism.

A still further object is to provide mechanisms for controlling the operation of the spindle and the sequence of operations of a plurality of slides and which mechanisms can be readily adjusted by hand without the use of wrenches or tools since they include accessible manually adjustable dogs for operating control switches, said dogs being provided with hand knobs.

Another object is to provide a machine tool as referred to in the above mentioned objects and which is so designed as to lend itself admirably to unit type construction wherein the units can be separately assembled and wherein the units are then assembled into a machine.

Another object is to provide a machine tool wherein the spindle speeds and the slide movements are controlled by mechanisms driven in timed relation to the movement of the turret slide at a fixed ratio therebetween irrespective of the length of travel of the turret slide.

Another object is to provide a machine tool having a turret slide provided with an indexible turret and wherein the feeding movements of the slide can be terminated at variable points for all the indexed positions of the turret depending upon the character and length of the cut being made by the cutting tools carried by the turret.

Another object is to provide a machine tool having a plurality of slides, each operated by an independent drive train unit including individual sets of pick-off gears in each train and which sets of gears are readily accessible for removal and replacement when it is desired to utilize a different set of gears to provide for a different rate of feeding movement for one or all of said slides.

A further object is to provide a machine tool having a spindle and a plurality of slides which can be operated manually, or automatically with continuous or intermittent spindle rotation and wherein safety features are embodied which prevent the operation of the machine during the adjustment of the control mechanisms, or when the pressure in the hydraulic circuit forming part of the machine control falls below a predetermined pressure.

A more specific object is to provide in a machine tool having a spindle and a plurality of slides, independent change speed drives from the spindle to independent operating shafts for the slides, together with independent quick motion motors operatively associated with each of such shafts and which drives can be manually controlled for purposes of setup.

A further object is to provide a machine tool having a spindle and a plurality of slides including a turret slide having an indexible turret and which machine tool is controlled by an axially movable and indexible controller driven from the turret slide operating shaft and indexible in timed relation with the turret through the medium of an unbroken gear train operative connection with the turret indexing mechanism.

A further and more specific object is to provide a machine tool having a spindle and a plurality of slides including a turret slide provided with an indexible turret all of said slides being independently operated from a spindle drive train, in combination, with an axially movable and indexible controller and a positively accelerated clutch for driving the turret slide operating shaft and wherein control is effected through an electrical control system not only by the axial movement of the controller but also by the positively accelerated clutch and by the indexing mechanisms for the turret and controller.

Further and additional objects and advantages not hereinbefore specified will become apparent during the detailed description of an embodiment of the invention which is to follow.

Referring to the accompanying drawings,

Fig. 1 is a front elevational view of a turret lathe, i. e., a single spindle automatic turret lathe, embodying the invention.

Fig. 2 is a plan view of the turret lathe shown in Fig. 1.

Fig. 3 is a developed cross-sectional view of the spindle drive train located in the headstock of the machine.

Fig. 4 is a fragmentary front elevational view of a portion of the headstock showing the control lever for the high and low spindle speed ranges, said lever being shown in full lines in the "low" range position and in dot and dash lines in the "high" range position.

Fig. 5 is a schematic illustration of a hydraulic circuit containing electrically operated control valves for the hydraulic clutches of the spindle drive transmission shown in Fig. 3, a portion of said control valves being shown in section.

Fig. 6 is a view partly in side elevation and partly in section of the electrically operated control valves shown in Fig. 5.

Fig. 7 is a sectional view taken substantially on line 7—7 of Fig. 6.

Fig. 8 is a diagrammatic developed partial sectional view of the operating or drive trains from the spindle to each of the cross slides.

Fig. 9 is a view mostly in elevation but partially in section of the control devices for the cross slides and which devices are located in a compartment contained in the lower portion of the headstock.

Fig. 10 is a sectional view taken substantially on line 10—10 of Fig. 9.

Fig. 11 is a fragmentary sectional view taken substantially on line 11—11 of Fig. 9 and showing the shaft for manually actuating the turret slide for setup purposes.

Fig. 12 is a fragmentary sectional view taken approximately on line 12—12 of Fig. 9 and illustrating the control switches for initiating the feeding movements of the cross slides.

Fig. 13 is a sectional view taken on irregular line 13—13 of Fig. 9 and illustrating safety switches embodied in the control circuits.

Fig. 14 is a sectional view taken substantially on line 14—14 of Fig. 9 and illustrating manually settable rotatable control elements operatively connected with the operating train for the cross slides and functioning to actuate certain cross slide control switches.

Fig. 14a is a front elevation of a portion of Fig. 14 and showing the switch actuating mechanism.

Fig. 14b is a top elevation of a portion of Fig. 14 showing the switch actuating mechanism.

Fig. 16 is a diagrammatic partly sectional view of the operating train from the turret slide operating shaft to the main control mechanism of the machine, which mechanism is located in a compartment in the bed at the foot end of the machine where it is readily accessible to the operator for purposes of adjustment, the relationship of the parts being that occurring at the commencement of the forward stroke.

Figs. 16a and 16b are views of a portion of Fig. 16 and showing the relationship of the parts at the end of the feed stroke and the end of the return stroke respectively.

Fig. 17 is a diagrammatic sectional view of the main control mechanism shown in Fig. 16 but illustrating the parts thereof in a different operative relationship than in the previous view.

Figs. 18 and 19 are fragmentary sectional views taken substantially on lines 18—18 and 19—19 of Fig. 17.

Fig. 20 is an end view of the indexing means for the main control mechanism.

Figs. 21 and 22 are fragmentary views on an enlarged scale of portions of the main control mechanism shown in Figs. 16 and 17.

Figs. 21a, 21b, 21c and 21d are detached views of the different cams constituting the cam structure at the left hand side of Fig. 21.

Figs. 22a, 22b and 22c are detail views of cam inserts mounted in the ring carried by the end wall or plate of the main control drum.

Fig. 23 is an elevational view of the main control panel located on the front side and near the top of the headstock.

Fig. 24 is a diagram showing the positions of the contacts of the double contact hand operated spindle speed selector switch in relation to the different spindle speeds.

Fig. 25 is a diagram showing the positions of the different contacts of the four contact hand feed selector switch in relation to four different feeds.

Fig. 26 is a diagram showing the condition of the fifteen contacts in the hand automatic selector switch for different set positions of said switch.

Fig. 27 is a diagram showing the position of the three contacts of the spindle control switch in its three operative positions.

Figure 28:
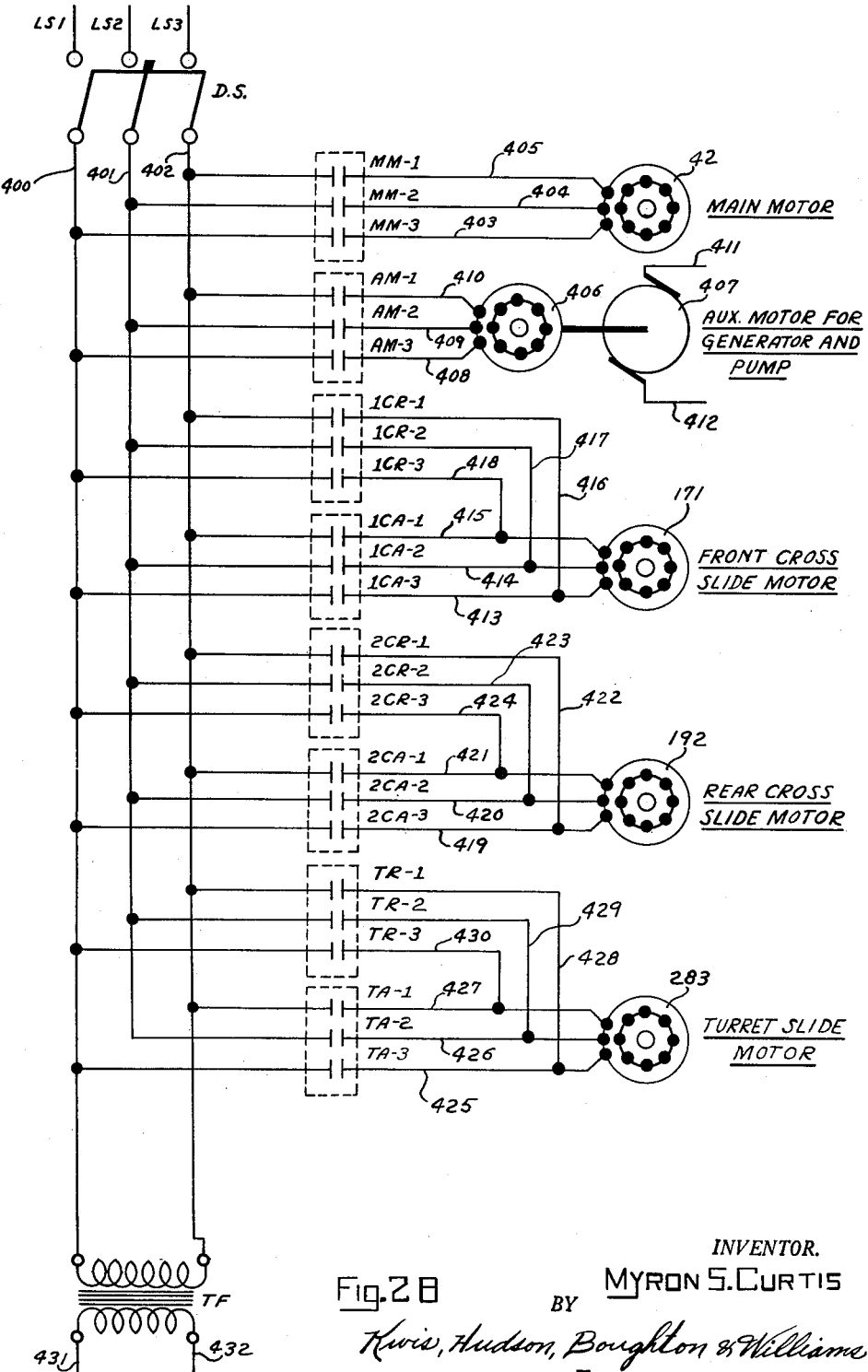

Fig. 28 is a wiring diagram of the power circuit.

Figure 29:
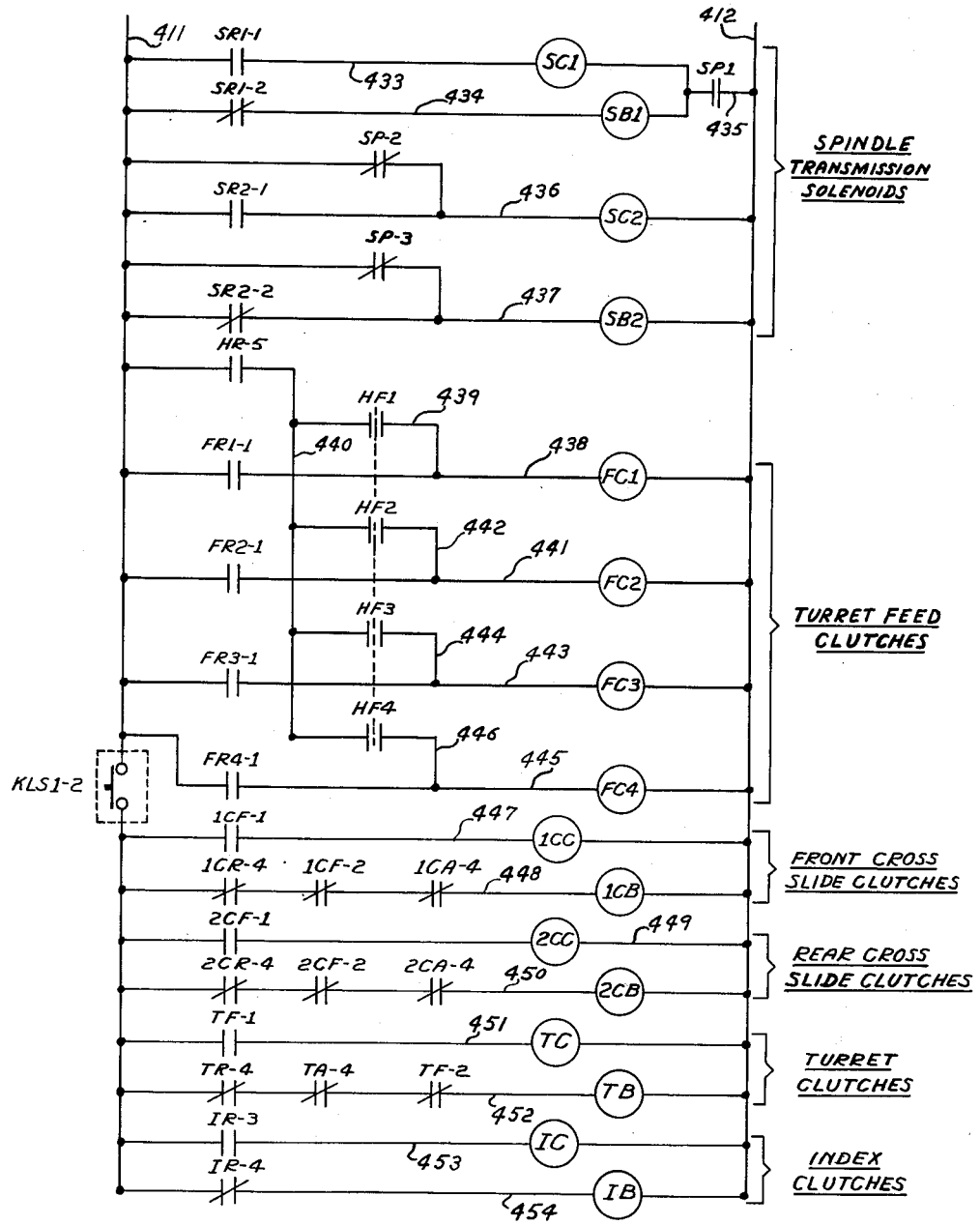
Figure 30:
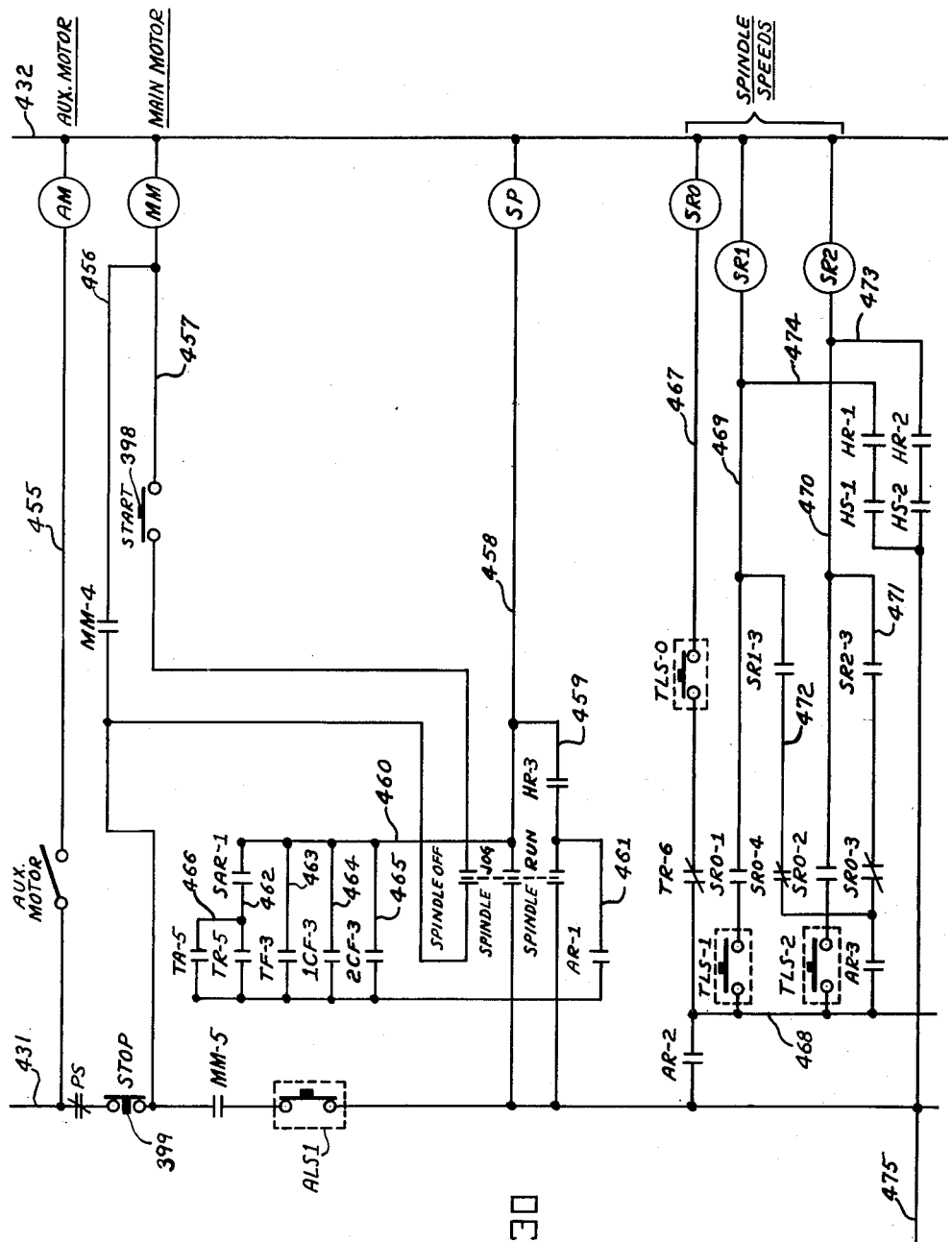

Fig. 29 is a wiring diagram of the D. C. control circuit for the solenoids which actuate the control valves in the hydraulic circuit to the hydraulic clutches in the drive train to the spindle and for the magnetic clutches in the operating trains between the spindle and the turret slide and cross slides, and Figs. 30, 31 and 32 are diagrams of portions of the complete control circuit and are to be considered as a single illustration of the control circuit.

Referring to the drawings and particularly to Figs. 1 and 2 thereof, the single spindle turret lathe embodying the invention comprises a bed 36 at the head end of which is a headstock 37. The headstock 37 rotatably mounts a work spindle 38 (see Fig. 8) as will be well understood in the art and which spindle, in this instance, carries a chuck 39. It will be understood that in place of the chuck the spindle may be provided with a collet chuck to enable the machine to operate on bar stock. The headstock 37 on its front side near its top is provided with a control panel 40, later to be referred to, and in the head end of the bed 36 beneath the headstock 37, there is provided a compartment having cross slide control mechanism and which compartment is closed by a cover or door 41. The spindle 38 is driven by a main drive motor 42 secured to the headstock.

The bed 36 is provided on its upper side with parallel ways 43 on which moves a turret slide 44 provided with an indexible turret 45. The ways 43 also adjustably support carriages 46 for the front cross slide 47 and the rear cross slide 48 and which slides move transversely of the bed on parallel ways 49 on the upper sides of the carriages 46. The main control mechanism for the machine is housed in a compartment in the bed, access to which is provided by means of a removable closure or door 50.

Inasmuch as the different portions of the machine readily lend themselves to unit construction and assembly and to being mounted in the machine as units the description of the different portions of the machine will be set forth herein under the respective unit headings, it being understood that although these units are shown diagrammatically and in developed views actually each constitutes a compact unit assembly which is mounted in the machine as a unit.

*Spindle drive train unit*

The spindle drive train unit which is mounted in the headstock 37 comprises a shaft 51 which is operatively connected with the shaft of the motor 42 supported by the headstock (see Fig. 3). The shaft 51 extends parallel to the spindle 38 and is rotatably supported in axially spaced antifriction bearings mounted in internal rib formations 52 within the headstock and in a bearing supporting plate 53 detachably connected to the rib formations 52. Spaced elements 54 and 55 of a hydraulic clutch are freely rotatable on the shaft 51 and each element includes a portion which carries and houses, respectively, a clutch plate 56 and a clutch plate 57. The clutch element 54 has formed thereon a gear 58 while the element 55 is provided with a gear 59. Clutch plate carriers 60 in the form of sleeves are keyed to the shaft 51 and are located within the portion of the elements 54 and 55 that carry and house the clutch plates 56 and 57. The carriers 60 mount clutch plates 61 and 62 located on opposite sides of the plates 56 and 57 and rotatable with the carriers 60 and shaft 51 but movable axially relative to the plates 56 and 57. A sleeve 63 is keyed to the shaft 51 intermediate the two clutch plate carriers 60 and said sleeve midway of its ends is provided with a circular radial partition 64, the outer end of which has fixed to it a closure band 65. On each side of the radial partition 64 and movably supported by the sleeve 63 and band 65 are ring pistons 66 and 67 which can be selectively moved by hydraulic pressure as will later be described to cause the clutch plates 61 and 62 of one or the other carrier to frictionally engage, as the case may be, the clutch plate 56 or the clutch plate 57 to operatively connect either the clutch element 54 or the clutch element 55 to the shaft 51.

The carriers 60 are provided with spring pressed plungers that act on the ring pistons 66 and 67 to urge the same toward the partition 64 in a direction to disengage both clutches. The shaft 51 beyond the inner anti-friction bearing extends into a sleeve 68 that is fixed in the internal ribs 52 of the headstock. The shaft 51 is provided with a bore that extends axially from the inner end of the shaft and communicates with radial passages 69 and 70 and which communicate, respectively, with openings in the sleeve 63 on opposite sides of the partition 64. The axial bore in the shaft 51 is provided with axially separate spacer rings 71, one of which is located in the plane of the partition 64 and the other of which is located within the sleeve 68. The spacer rings support a tube 72 of less diameter than the axial bore in the shaft 51. The tube 72 is provided with an opening 73 which communicates through the axial bore with the radial passage 69. The tube 72 adjacent its opposite end is provided with an opening 74 that communicates with the axial bore beyond the right hand spacer 71 and in turn with a radial passage 75 formed in the shaft 51. The axial bore in the shaft 51 intermediate the spacers 71 provides a chamber 76 which surrounds the tube 72 and said chamber adjacent one of its ends communicates with the radial passage 70 and adjacent its other end with a radial passage 77 formed in the shaft 51. The radial passages 75 and 77 communicate, respectively, with annular grooves 78 and 79 formed in the inner circumference of the sleeve 68. The grooves 78 and 79 communicate by means of one or more radial openings with grooves 80 and 81 formed in the outer periphery of the sleeve 68. The grooves 80 and 81 communicate, respectively, with passages 82 and 83 formed in the internal ribs of the headstock and connected to pipes 84 and 85 forming part of a hydraulic circuit later to be explained. The open end of the axial bore in the shaft 51 is closed by a threaded plug 86.

It will be seen that when hydraulic pressure fluid is admitted to the passage 82 and exhausted through the passage 83 said pressure fluid flows through the tube 72 and through the opening 73 and radial passage 69 to move the ring piston 66 to cause the clutch plates 61 and 62 to grip the clutch plates 56 and operatively interconnect the clutch element 54 with the shaft 51. Conversely, when the hydraulic pressure fluid is in the passage 83 and is exhausting from the passage 82, said pressure fluid flows into the chamber 76 and through the radial passage 70 to move the ring piston 67 to engage the clutch plates 61 and 62 with the clutch plate 57 and thus operatively interconnect the shaft 51 with the clutch element 55.

The gear 58 on the clutch element 54 constantly meshes with an idler gear 87 rotatably mounted on a stub shaft in the headstock and meshing in turn with a gear 88 keyed to an intermediate shaft 89. The gear 59 on the clutch element 55 constantly meshes with a gear 90 freely rotatable on a stub shaft in the headstock and meshing in turn with a gear 91 also keyed to the shaft 89. Hence the shaft 89 is driven from either of the clutch elements 54 or 55. The shaft 89 has keyed to it a reduction gear 92 which meshes with a gear 93 forming part of a clutch element 94 that is freely rotatable on a shaft 95. The gear 91 on the shaft 89 directly meshes with a gear 96 forming part of a clutch element 97 which is also freely rotatable on the shaft 95.

The clutch elements 94 and 97 are each provided with a clutch plate carrying housing portion, with said portion of the element 94 mounting three clutch plates 98 while said portion of the element 97 mounts a single clutch plate 99. A clutch plate carrier 100 is keyed to the shaft 95 within the clutch housing portion of the clutch element 94 and mounts four movable clutch plates arranged to engage the three clutch plates 98. A clutch plate carrier 101 is keyed to the shaft 95 within the clutch plate housing portion of the clutch element 97 and mounts two movable clutch plates which engage the clutch plate 99 as will be well understood in the art. Intermediate the carriers 100 and 101 a sleeve 102 is keyed to the shaft 95 and is provided with a radial partition 103 that has secured to its outer end a band 104. Ringe pistons 105 and 106 are slidably mounted on the sleeve 102 on opposite sides of the partition 103 and intermediate said sleeve and the band 104. The sleeve 102 is provided with openings 107 and 108 located on opposite sides of the partition 103 and communicating, respectively, with radial passages 109 and 110 formed in the shaft 95. The two last mentioned passages communicate with a bore formed in the shaft 95 and extending axially thereof to the inner end of said shaft. Spacers 111 are located in said axial bore with one of the spacers aligned with the partition 103 of the sleeve and the other spacer being located in the reduced inner end of the shaft which extends into a sleeve 112 fixed in the supporting ribs 52 within the headstock. The spacers 111 mount a tube 113 which extends the full length of the axial bore and is provided at its opposite ends with openings similar to the openings in the tube 72. The space surrounding the tube 113 intermediate the spacers 111 constitutes a chamber 114, one end of which communicates with the passage 110 and the other end of which communicates with a passage 115 formed in the inner end of the shaft 95. The sleeve 112 is provided on its inner circumference with annular grooves 116 and 117 and which communicate, respectively, with the radial passages 118 and 115 formed in the inner end of the shaft 95. The sleeve 112 on its outer circumference is provided with annular grooves 119 and 120 and said annular grooves are connected by radial openings in the sleeve to the annular grooves 116 and 117. The grooves 119 and 120 are connected, respectively, to the pipes 121 and 122 of a hydraulic circuit which includes the pipes 84 and 85 previously referred to.

As will be well understood when hydraulic pressure fluid is in the pipe 121 and is being exhausted from the pipe 122 said pressure fluid will pass through the tube 113 and move the ring piston 105 to engage the clutch plates of the carrier 100 with the three clutch plates 98 of the clutch element 94, wherefore said element will be operatively connected to the shaft 95 to cause rotation of the latter. Conversely, when hydraulic pressure fluid is in the pipe 122 and is being exhausted from the pipe 121 said pressure fluid will act through the chamber 114 to cause the ring piston 106 to move to frictionally engage the clutch plates of the carrier 101 with the clutch plate 99 of the clutch element 97 to cause the shaft 95 to be rotated by said clutch element.

The shaft 95 has keyed thereto an elongated gear 123 which meshes with the large gear 124 of a manually shifted two-step gear cone that is freely rotatable and endwise movable on a countershaft 125, said gear cone being provided with a smaller gear 126.

From the foregoing description it will be evident that the shaft 95 can be driven from the motor 42 through the hydraulic clutches and gearing already described at any one of four different speeds and hence the elongated gear 123 and the gears 124 and 126 of the two-step gear cone on the countershaft 125 can also be driven at any one of four different speeds.

Referring to Fig. 8 it will be seen that the two-step gear cone can be axially shifted on the shaft 125 to engage the gear 124 with a gear 127 or to engage the gear 126 with a gear 128, said gears 127 and 128 being fixed to the work spindle 38. The shiftable gear cone on the shaft 125 provides for high and low speed ranges of operation of the work spindle 38 at four different speeds in each range thus enabling the work spindle to be driven at any one of eight different speeds.

In order to manually shift the two-step gear cone on the shaft 125 a shaft 129 is rockably mounted in the front wall of the headstock and has fixed to its outer end in front of the headstock an operating lever 130, see Figs. 1 and 4. The inner end of the shaft 129 has fixed thereto an actuating fork 131 which straddles the annular groove 132 in the two-step gear cone and is provided with shoes engaging in said groove. It will thus be seen that when the lever 130 is rocked by the operator to the full line or low position of Fig. 4 the two-step gear cone is shifted to intermesh the gear 126 thereof with the gear 128 on the spindle, and conversely, when the lever 130 is swung to high position the gear cone is axially shifted to intermesh its gear 124 with the gear 127 on the work spindle.

The hydraulic clutches on the shafts 51 and 95 of the spindle drive train unit are controlled by four electrically actuated control valves 133 slidably mounted in valve chambers formed in a valve housing 134 (see Figs. 5, 6 and 7). The valves 133 are provided with pins 135 extending outwardly of the valve housing and carrying springs 136 abutting plates on said housing and heads on said pins and acting normally to maintain the valves in a position such that the pipes 84, 85 and 121, 122 are connected to the exhaust side of the hydraulic circuit.

The housing 134 is provided with an exhaust passage 137 that is in communication with each valve chamber by means of ports and is connected with an exhaust or discharge pipe 138 that extends to the reservoir 139. The housing 134 is also provided with a pressure passage 140 which is in communication with the four valves by means of ports. The pressure passage 140 is connected by a pipe 141 to the output side of a pump 142, the input side of which is connected by a pipe 143 with the reservoir 139. The pipe 141 contains a filter and also is operatively associated with a pressure switch PS, later to be referred to, and which functions to interrupt the entire electrical control circuit for the machine when the hydraulic pressure falls below a predetermined point. The valve chambers of the four valves are connected by laterally extending passages and ports 144 with the pipes 84, 85, 121 and 122, respectively, it being noted by reference to Fig. 7 that when any of the four valves are in their normal positions under the action of the springs 136 said passages 144 are in communication with the discharge passage 137. The valves may be moved from their normal position to an operative position to selectively place the passages 144 in communication with the pressure passage 140 to cause hydraulic pressure to flow in one or more of the pipes 84, 85, 121, 122 to engage either of the two hydraulic clutches on the shafts 51 and 95. Thus it will be seen that either hydraulic clutches on the shaft 51, as desired, may be engaged simultaneously with the engagement of either hydraulic clutch on the shaft 95 as desired in order to complete the drive from the motor 42 to the spindle. It will also be noted that if both hydraulic clutches on the shaft 95 are engaged simultaneously a braking effect will be produced on said shaft and hence on the spindle geared thereto.

The four valves are moved from their normal positions to their actuated positions by means of solenoids SB1, SB2, SC1 and SC2, see Fig. 6, and said solenoids have their armatures operatively connected to their respective valves, wherefore when a solenoid is energized the respective valve is moved against the action of the spring 136 from its normal position to its actuated position. The four solenoids referred to are in the control circuit later to be described. Each solenoid is supporetd in a frame 145 which has its upper end extending into a channel 146 and held therein by means of pins 147. The channels 146 are secured by screws to the underside of the horizontal arm of an angle bracket 148, the vertical arm of which is secured to the valve housing 134. Hence it will be seen that in order to remove any of the solenoids for replacement or for other purposes it is merely necessary to remove the proper screws from the angle plate 148 and then remove the desired solenoid, its housing 145 and its supporting channel 146, it being understood that first the respective valve has been removed from the valve chamber by removal of the proper plate 149. Therefore any of the solenoids can be removed for replacement or repairs without disturbing any of the other solenoids.

*Individual drive train units from spindle to cross slides*

The front cross slide 47 and the rear cross slide 48 each can be driven from the spindle by individual drive train units that can be separately assembled into a subassembly and then assembled into the machine.

The spindle 38 has fixed thereto a gear 150 which meshes with a gear 151 fixed to a shaft 152 rotatable supported in the headstock, see Fig. 8. The shaft 152 also has fixed thereto a gear 153 which forms no part of the drive train to the cross slide but does form part of the turret slide drive train unit shown in Fig. 15 and later to be referred to.

The shaft 152 has fixed to it a double pickoff gear formed of the gears 154 and 155. The gear 154 meshes with a pick-off gear 156 fixed to a rotatable countershaft 157. The shaft 157 also has fixed thereto a wide faced gear 158 which constantly meshes with the large gear 159 of a manually shiftable two-step gear cone that includes a small gear 160. This two-step gear cone is rotatable and slidable on a fixed shaft 161 and in the position shown in Fig. 8 its smaller gear 160 is in mesh with the larger gear 162 of a gear cluster fixed to a shaft 163. When the gear cone is shifted to its other operative position its larger gear 159 meshes with the small gear 164 of the gear cluster, at which time of course the gears 160 and 162 will be out of mesh.

The two-step gear cone on the shaft 161 is manually shifted to either of its two operative positions by means of a lever 165 located in a suitable and convenient position on the headstock and operatively connected to the gear cone as will be well understood in the art (see Fig. 1).

The shaft 163 has freely rotatable and slidable on it an internal gear 166 and operatively associated with said gear is an electromagnet ICC which when energized holds the gear 166 against rotation as will be well understood. The shaft 163 internally of the gear 166 has fixed to it a sun gear 167 which constantly meshes with one or more pinions 168 rotatably carried by a pinion carrier 169 as is customary in planetary gear units.

The pinion carrier 169 is splined to a shaft 170 while an electromagnet ICB is operatively associated with said carrier and when energized acts to hold the carrier and shaft 170 against rotation and hence may be termed a brake magnet.

It will be understood that when the magnet ICC is energized and the gear 166 held against rotation the shaft 170 will be driven from the sun gear 167 due to the rotating pinions 168 traveling around the inner circumference of the gear 166 and hence rotating the carrier 169 and shaft 170 at a reduced speed with respect to the shaft 163. Energization of the magnets ICC and ICB is controlled by the control circuit later to be described.

The shaft 170 extends through and is fixed to the rotor of a front cross slide reversable rapid traverse motor 171, the stator and housing of which motor are stationarily fixed to the wall of the unit. The rapid traverse motor 171 is only energized when the magnets ICC and ICB are both deenergized and when said motor is energized it imparts independent rapid rotation to the shaft 170 to effect rapid traverse of the front cross slide 47 in either direction as will later be explained.

It will be understood that when the motor 171 is energized then the pinion carrier 169 rotating with the shaft 170 at a rate higher than the rotation of the sun gear 167 causes the pinions and the gear 166 to rotate at a rate representing the difference between the rotation of the carrier and the sun gear 167 without imparting a rotative movement to the sun gear. The shaft 170 at its end beyond the motor 171 has fixed to it a bevel gear 172 which constantly meshes with a bevel gear 173 forming part of a cam drum 174 that is freely rotatable on a fixed supporting shaft 175. The drum 174 is provided with a cam groove 176 having at its inner end a dwell portion 176a.

The front cross slide 47 carries a follower 177 which engages in the cam groove 176 and hence it will be seen that rotation of the drum 174 causes said slide to move inwardly or outwardly depending upon the direction of rotation of the drum. Inasmuch as the spindle 38 only rotates in one direction the rotation of the drum 174 for outward movement of the cross slide 147 is effected only by the reverse energization of the motor 171 for rapid outward movement of the slide.

Intermediate the motor 171 and the bevel gear 172 the shaft 170 has fixed thereto a bevel gear 178 which meshes with a bevel gear 179 fixed to a shaft 180 that extends into the cross slide control unit located in the compartment below the headstock and illustrated in Fig. 9. The purpose of said shaft 180 will be brought out in the description of the cross slide control unit later to be set forth.

The gear 155 of the double pick-off gear on the shaft 152 meshes with a pick-off gear 181 carried by a rotatable shaft 182 and similar to the pick-off gear 156 previously described in the drive train to the front cross slide. The shaft 182 has fixed thereto a wide faced gear 183 which constantly meshes with the larger gear 184 of a two-step gear cone that is rotatable and slidable on a fixed shaft 185. This two-step gear cone may be axially shifted manually by means of a control lever 186 mounted in a suitable location on the headstock adjacent to the lever 165 and operatively connected to the gear cone in a manner similar to the connection between the lever 165 previously referred to in the description of the drive to the front cross slide.

The smaller gear 187 of the two-step gear cone on the shaft 185 in one operative position of said cone meshes with the larger gear 188 of a gear cluster fixed to a shaft 189. The larger gear 184 of said two-step gear cone in the other operative position of the cone meshes with the smaller gear 190 of the said gear cluster. It will be seen that the shaft 189 can thus be driven at two different speeds from the shaft 182 which in turn is driven in timed relation to the spindle 38.

The shaft 189 is connected to the drive shaft 191 for the rear cross slide 48 by planetary gearing similar to the planetary gearing used to connect the shaft 163 to the drive shaft 170 for the front cross slide 47 and hence the elements of the planetary gearing in the drive to the rear cross slide are designated by corresponding reference numerals with the exponent $a$. However, the magnet which cooperates with the gear 166$a$ of this planetary unit and the magnet which cooperates with the pinion carrier 169$a$ of said unit are designated, respectively, as 2CC and 2CB for convenience in describing the control circuit later to be referred to.

The shaft 191 extends through and is keyed to the rotor of a rear cross slide reversible rapid traverse motor 192, the stator and housing of which are fixedly mounted in the walls of the unit. The shaft 191 through bevel gear 193 fixed thereto drives bevel gear 194 forming part of the actuating drum 195 for the rear cross slide 48. The drum 195 is freely rotatable on a fixed supporting shaft 196 and is provided with a cam groove 197 that has at its inner end a dwell portion 197$a$. A follower 198 carried by the rear cross slide 48 engages in the cam groove 197. It will be understood that the operation of the planetary gear unit, motor 192 and the cross slide 48 is similar to the operation of the corresponding portions in the drive to the front cross slide 47 as previously explained and hence need not be repeated herein.

The shaft 191 has fixed to it a bevel gear 199 which meshes with a bevel gear 200 fixed on a shaft 201 that extends into the cross slide control unit shown in Figs. 9 to 14 inclusive, later to be referred to.

From the foregoing it will be seen that the front and rear cross slides 47 and 48 can be moved inwardly at both rapid traverse and feeding rates and can be moved outwardly at rapid traverse due to the selective actuation of the magnetic clutches and the controlled energization of the motors 171 and 192 by the control circuit later to be referred to. It will also have been seen that the feed drives to the front and rear cross slides are independently driven by the spindle and can be selectively operated at any one of two different speeds in relation to each of the spindle speeds through manipulation of the manual levers 165 and 186.

Control unit for cross slides

As previously intimated a control unit for the front and rear cross slides is mounted in the compartment in the head end of the bed and which compartment is normally closed by the door 41 accessible from the front of the machine.

This control unit for the cross slides is illustrated in Figs. 9 to 14 inclusive. In the lower part of the compartment there is located a switch box 202 and said switch box is normally concealed by a guard plate 203 secured to the bed 36. The switch box 202 contains a group of switches ICLS3-1, ICLS6-1, ICLS5-1, ICLS7-1 and ICLS4-1 arranged in a horizontal plane with the switches ICLS7-1 and ICLS4-1 located behind the switches ICLS3-1 and ICLS5-1, respectively, see Fig. 10. This group of switches also includes a double throw single pole switch ICLS1-1 and 2 located in the rear of the switch box 202 at a lower level than the switches previously referred to. The switch ICLS3-1 is the sealing switch for the front cross slide while switch ICLS6-1 is a safety switch to prevent forward over travel of the cross slide in hand operation. The switches ICLS5-1 and ICLS4-1 operate at the end of the rapid traverse of the front cross slide to change from rapid traverse to feed. Switch ICLS7-1 is a safety switch to prevent overtravel on the outward stroke of the front cross slide in hand operation and switch ICLS-1 and 2 operates to stop the feed of the front cross slide and initiate the return stroke thereof. A similar group of switches for the rear cross slide is mounted in the switch box 202 and includes the switches 2CLS5-1, 2CLS3-1, 2CLS6-1, 2CLS4-1 and 2CLS7-1 corresponding to the switches ICLS3-1, ICLS6-1, ICLS5-1, ICLS7-1 and ICLS4-1 of the first described group. The second group of switches also includes a switch 2CLS1-1 and 2 corresponding to switch ICLS1-1 and 2 of the first group. Also mounted in the switch box 202 are single pole single throw safety switches KLS1-1 and KLS1-2 which have actuating rods 204 extending upwardly through the top of the switch box 202 and in position to be engaged and displaced by an actuating bracket 205 carried by the inner side of the door 41 adjacent its lower edge.

It will be understood that when the door 41 is in closed position the bracket 205 displaces the rods 204 and the switches KLS1-1 and KLS1-2 are closed. When the door 41 is open and the bracket 205 moves out of engagement with said actuating plungers both of said switches are open to interrupt the control circuits to prevent operation of the machine. The manner in which all of the switches hereinbefore mentioned function will be set out in detail in the description of the wiring diagrams of the control circuits.

The two groups of switches in the switch box 202 with the exception of the switches ICLS1-1 and 2 and 2CLS1-1 and 2 have their switch buttons extending through the top of the switch box 202 as clearly indicated in Fig. 9. The switches ICLS1-1 and 2 and 2CLS1-1 and 2 have their actuating elements 206 and 207 extending upwardly of the rear of the switch box 202 and connected to an actuating shaft in a manner later to be explained. The top of the switch box 202 has secured thereto two U-shaped brackets 208 with said brackets being located, respectively, intermediate the switch buttons of the switches ICLS3-1, ICLS7-1, ICLS6-1 and 2CLS3-1, 2CLS7-1, 2CLS6-1. Each bracket 208 rockably supports a shaft 209 and said shafts are operatively connected by arms 210 to the actuating elements 206 and 207 of the switches ICLS1-1 and 2 and 2CLS1-1 and 2 (see Fig. 14$a$). The shafts 209 have freely rockable thereon within and adjacent to the arms of the brackets 208 dogs 211 and 212 which are angularly displaced with respect to each other. The dogs 211 and 212 are provided with upstanding ears 211a and 212a arranged to lie in the path of cam rings later to be referred to. The shafts 209 intermediate the ears 211a and 212a and behind the dogs 211 and 212, as viewed in Fig. 9, have mounted thereon dogs 213 fixed to the shafts, it being noted that rocking movement of the dogs 213 effects rocking of the shafts. The dogs 213 are provided with upstanding ears 213a and 213b similar to the ears 211a and 212a. Ears 213a are directly behind ears 211a and both are operated by cam rings 229. Ears 212a are directly behind ears 213b and are operated by cam rings 228.

The dogs 211 and 212 are substantially U-shaped and S-shaped respectively with one of the arms shorter than the other in order to provide for the proper spacing of the dogs on the shafts. The functions of the dogs on the shafts 209 will be explained hereinafter, it being noted however, that the dogs 212 engage the switch buttons of the switches 1CLS3-1, 1CLS7-1, 2CLS3-1 and 2CLS7-1, while the dogs 211 engage the switch buttons of the switches 1CLS6-1 and 2CLS6-1, it being recalled that the dogs 213 are fixed to the shaft 209 to rock the latter and effect actuation of the switches 1CLS1-1 and 2 and 2CLS1-1 and 2.

The top of the switch box 202 also has secured thereto U-shaped brackets 215 which mount shafts 216. Dogs 217 and 218 are mounted one behind the other so as to be freely rockable on the shafts 216 and are held in properly spaced relationship by means of contacting U-shaped portions, see Fig. 12. The dogs 217 and 218 have portions, respectively, which engage the switch buttons of switches 1CLS4-1 and 2CLS4-1 and 1CLS5-1 and 2CLS5-1. The dogs 217 and 218 also have portions which lie in the path of the cam rings later to be referred to.

The shafts 180 and 201 of the drive train units to the cross slides (see Fig. 8) extend into the compartment in the head end of the bed and above the switch box 202, see Figs. 9 and 14. These shafts have mounted thereon within the compartment similar adjustable control drums designated in their entireties by the numeral 219 with one of the drums forming a control drum for the front cross slide and the other drum the control drum for the rear cross slide. Inasmuch as the drums are similar in construction it is only necessary to describe in detail one of said drums and for that purpose the control drum for the rear cross slide shown in cross section in Fig. 14 will be described.

The shaft 201 rotates within a sleeve 220 fixed in a boss in the bed 36 and provided at its right hand end as viewed in Fig. 14 with a gear 221. A gear 222 rotates on the sleeve 220 inwardly of the gear 221 and fixed on the hub of said gear 222 is a cup-shaped drum housing 223 that is closed at its open and front end by a dial plate 224 removably secured to the drum. The dial plate 224 is provided with a central opening through which the shaft 201 extends and said shaft outwardly of this plate is provided with a polygonal portion 201a to receive a socket wrench, wherefore in this particular instance the rear cross slide can be manually moved for setup purposes, it being understood that the shaft 180 for the front cross slide can also receive a socket wrench for the same purpose.

A carrier 225 is keyed to the shaft 201 intermediate the sleeve 220 and the plate 224 and said carrier mounts a rotatable pinion 226 which meshes with the gears 221 and 222. The gear 222 has one tooth more than the gear 221 and since the gear 221 does not rotate, rotation of the carrier 225 with the shaft 201 will cause the pinion 226 to travel around the gear 221 and to impart a one tooth advance rotation to the gear 222 and housing 223 for each complete rotation of the shaft 201. Therefore the drum 219 will rotate in a definite predetermined relationship to the rotation of the shaft 201 and the movement of the rear cross slide, the same being true with respect to the drum 219 on the shaft 180 of the front cross slide drive.

The drum 219 mounts four adjustable cam rings 227, 228, 229 and 230. The cam rings are provided on their inner peripheries with gear teeth located in four circumferentially spaced recesses formed in the housing 223 extending parallel with the shaft 201. Each of said recesses is related to a respective cam ring and is aligned with an opening in the plate 224 which has a tapered configuration 231 adjacent its outer end. A shaft 232 is rotatably mounted in each recess and extends outwardly of the plate 224 through a registry opening therein and is provided on its outer end with an actuating knob. Each shaft 232 has a conical portion 233 which is normally held by a spring 234 in frictional contact with the conical surface 231, wherefore each shaft 232 is held against undesired rotation because of vibration or for other causes.

Each shaft 232 is provided with a pinion 235 that meshes with the gear teeth on the inner periphery of the respective cam ring. It will be understood that each pinion 235 is so positioned axially on shaft 232 as to mesh with the gear teeth of its respective cam ring. Hence the pinions 235 are located in the planes of their respective cam ring. Consequently when it is desired to adjust one or more of the cam rings carried by the drum the operator can push in the proper actuating knob or knobs to disengage the conical holding surfaces 233 and 231 and then rotate the shaft or shafts in the proper direction to move the cam rings circularly with respect to the drum.

The four actuating or adjusting knobs on the control drum are indicated at 236, 237, 238 and 239 and the shafts 232 and pinions 235 with which said knobs are associated effect the adjustments of cam rings 227, 228, 229 and 230, respectively, it being noted that said knobs bear the identifications "Stroke," "Feed No. 2," "Dwell adjustment" and "Feed No. 1." The cam rings 227 and 230 are provided with camming portions which engage and actuate the dogs 217 and 218. The cam rings 228 and 229 are provided with camming portions which engage and actuate the dogs 211, 212, and 213.

Each dial plate 219 is provided with indicia representing in inches the stroke of the respective cross slide. Also each plate carries indicia representing in time increments different dwell periods. The indicia on the dials cooperate with fixed pointers 240 formed on the edge of the adjacent flange of a portion of an internal rib of the bed 36 and which flange embraces the upper peripheries of the drums. The manner in which the control drums 219 are adjusted and the purpose for such adjustments will be set forth hereinafter during the explanation of an operative cycle of the machine.

It has already been stated that access to the compartment containing the control drums is readily obtained by means of a door 41 which is hinged at its lower edge to the guard 203 by means of any suitable hinge as, for example, an elongated piano type hinge indicated at 241 in Fig. 14. Whenever the door 41 is swung outwardly to its open position the bracket 205 carried by the inner side of the door moves out of engagement with the actuating plungers 204 of the switches KLS1—1 and 2 to interrupt the control and feed circuits so that the machine cannot be operated during manual adjustment of the control drums 219 or manual actuation of the cross slides or of the turret slide.

The turret slide 44 can be manually adjusted for setup purposes by means of a wrench engaging a polygonal portion 242 of a shaft 243 which extends into the compartment adjacent to the right hand control drum 219 of Fig. 9, see Fig. 11. The shaft 243 has fixed to it a bevel gear 244 which meshes with a bevel gear in the drive train to the turret slide and which train is now to be described.

*Turret slide drive train unit*

Figure 15:
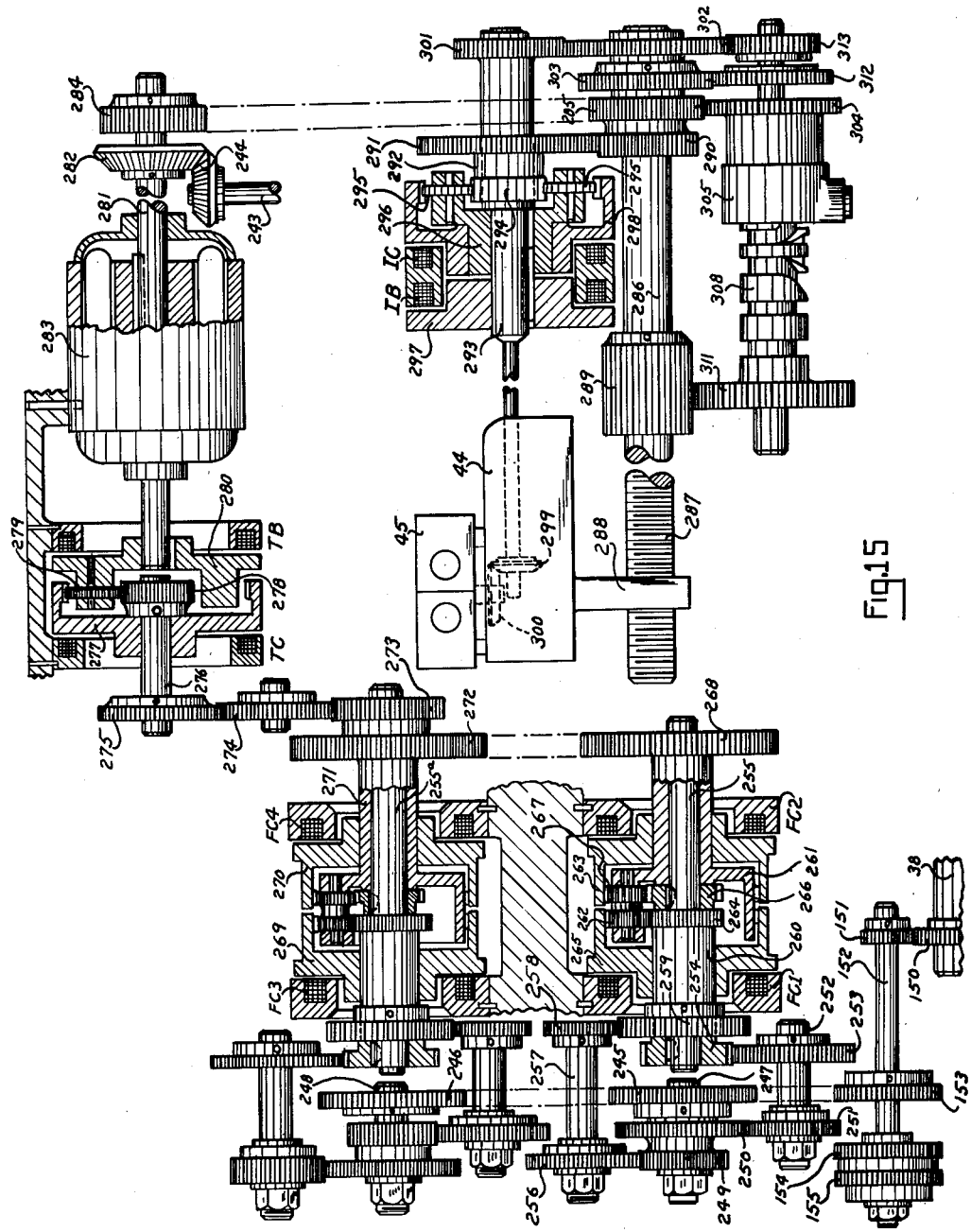
Fig. 15 is a diagrammatic developed partial sectional view of the operating or drive train from the spindle to the turret slide and to the turret indexing mechanism.

The turret slide drive train unit is located in the head end of the machine and is actuated from the shaft 152, see Figs. 8 and 15, which in turn is driven directly from the work spindle 38. Referring to the developed view of the turret slide drive train unit shown in Fig. 15, it will be seen that the gear 153 meshes with gears 245 and 246 fixed, respectively, to shafts 247 and 248 rotatable in the head end of the machine. The shaft 247 has splined thereto two pickoff gears 249 and 250. The gear 250 meshes with a pickoff gear 251 fixed to a rotatable shaft 252 and which shaft has fixed thereto a gear 253. The gear 253 meshes with a gear 254 that is fixed to a shaft 255. The pickoff gear 249 on the shaft 247 meshes with a pickoff gear 256 splined to a rotatable shaft 257 which has fixed thereto a gear 258 that meshes with a gear 259 fixed to a sleeve 260 that is freely rotatable on the shaft 255. The shaft 255 also has freely rotatable on it the sleeve portion of a pinion carrier 261 of a planetary gear unit. This carrier is provided with a dual pinion unit formed of the pinions 262 and 263. The pinion 262 meshes with a sun gear 264 formed on the sleeve 260 and with an internal gear 265, the sleeve portion of which gear is freely rotatable on the sleeve 260. The pinion 263 meshes with a sun gear 266 fixed to the shaft 255 and with the internal gear 267, the sleeve portion of which gear is freely rotatable on the sleeve portion of the carrier 261. Electromagnets FC1 and FC2 are operatively associated with the gears 265 and 267, respectively. It will be seen that when the magnet FC1 is energized while the magnet FC2 is deenergized the gear 265 will be held by the magnet FC1 against rotation, wherefore the sun gear 264 rotating the pinion 262 will cause the carrier 261 to rotate at a predetermined speed. Conversely, when the gear 267 is held against rotation upon energization of the magnet FC2 and deenergization of magnet FC1 then the sun gear 266 on the shaft 255 will drive the pinion 263 to cause predetermined rotation of the carrier 261 at a different speed. It will be understood that when one of the two gears 265 and 267 is held the other gear is freely rotating and at a different speed than the carrier as is well understood in planetary gear units. The sleeve portion of the carrier 261 is provided with a gear 268 and therefore the described gearing can impart two different speeds to the gear 268 and these two speeds can be varied by substituting different sets of the pickoff gears previously described.

The turret slide drive train unit also included another group of pickoff gears and a second planetary gear unit driven from the gear 246 on the shaft 248. Inasmuch as this second group of pickoff gears and second planetary gear unit is substantially identical with that already explained except for the ratios of the pickoff gears, a detailed description of this second group and unit appears to be unnecessary except to point out that the gears 269 and 270 of the second planetary gear unit are held against rotation respectively by electromagnets FC3 and FC4, while the sleeve portion 271 of the pinion carrier of the second planetary unit is provided with a gear 272 that meshes with the gear 268 of the pinion carrier of the first unit. The gear 272 is the larger of a double cluster, the other gear of which is indicated at 273. It will be seen that the gear 273 through the two groups of pickoff gears and through the two planetary units can be driven from the work spindle at any one of a series of four different speeds and which series of speeds can be changed by substitution of different pickoff gears in the two groups of such gears. As will be explained later, the energization and deenergization of the magnets FC1, FC2, FC3 and FC4 will be effected automatically by the main control mechanism of the machine.

The gear 273 meshes with and drives a gear 274 that is rotatable on a stub shaft and which meshes with and drives a gear 275 fixed to a shaft 276. The shaft 276 extends through the center of an internal gear 277 which is freely rotatable on said shaft. A sun gear 278 is fixed to the shaft 276 within the gear 277 and meshes with a plurality of rotatable pinions 279 carried by a pinion carrier 280 which is fixed to a shaft 281. An electromagnet TC when energized holds the gear 277 against rotation, wherefore rotation of the gear 278 rotates the pinions 279 and causes them to roll around the gear 277 and effect a resultant rotation of the carrier 280 and shaft 281 at a predetermined speed. Energization of an electric magnet TB holds the carrier 280 against rotation and functions as a brake for the movement of shaft 281. The energization and deenergization of magnets TC and TB are controlled by the main control mechanism later to be described.

The shaft 281 has fixed to it a bevel gear 282 which meshes with the bevel gear 244 on the manually operated shaft 243 shown in Fig. 11 and located in the compartment at the head end of the machine for the purpose of allowing manual operation of the turret slide for setup. The shaft 281 extends through and is fixed to the rotor of a turret slide reversable rapid traverse motor 283, the housing of which is fixed against movement in the head end of the machine. The motor 283 is automatically controlled by the main control mechanism of the machine as will later be explained. The shaft 281 extends longitudinally of the bed from the head end of the machine to adjacent the foot end thereof where it has fixed to it a gear 284. The gear 284 meshes with the larger gear 285 of a double gear cluster that is freely rotatable on the shaft 286 which is the operating shaft for the turret slide 44 and has a screw threaded portion 287 cooperating with a nut portion 288 carried by the turret slide. The shaft 286 has fixed to it a wide faced gear 289 the purpose of which will later be referred to. The smaller gear 290 of the double cluster on the shaft 286 meshes with a gear 291 formed on a sleeve 292 that is freely rotatable on an enlarged portion of a shaft 293. The sleeve 292 also has a sun gear 294 which meshes with pinions 295 rotatably carried by a pinion carrier 296 that is splined to the shaft 293. Also splined to the shaft 293 is a brake disk 297. An internal gear 298 has its sleeve portion freely rotatable on the sleeve portion of the pinion carrier 296 while electromagnets IB and IC are located intermediate the disk 297 and the gear 298 and surround the sleeve portions thereof with the magnet IB acting when energized on the disk 297 to hold the latter and the shaft 293 against rotation while the magnet IC when energized acts to hold the gear 298 against rotation.

The magnet IB or IC is energized, respectively, when the other is deenergized and it will be seen that when the gear 298 is held against rotation by the magnet IC while the sleeve 292 is being driven, then the sun gear 294 rotates the pinions 295 and causes the same to travel around the gear 298 and to effect rotation of the carrier 296 and shaft 293. The shaft 293 extends longitudinally of the bed and into the turret slide 44 and has splined to it a bevel gear 299 which moves with the turret slide relative to the shaft and meshes with a bevel gear 300 that actuates the indexing of the turret 45. The shaft 293 beyond the gear 291 on its enlarged portion is provided with a gear 301 that meshes with a gear 302 freely rotatable on a reduced portion of the shaft 286. The shaft 286 also has fixed to it a gear 303 and the purpose of the gears 302 and 303 will later be explained.

Referring to Fig. 16 it will be seen that the gear 285 meshes with a gear 304 formed on a sleeve-like driving member 305 of a connecting and positioning device or clutch which is described in the copending application of Myron S. Curtis and Harry Schoepe, Serial No. 485,980, filed May 7, 1943 now Patent No. 2,424,153, granted July 15, 1947. The driving member 305 is freely rotatable on a shaft 306 but is held against axial movement on said shaft. This driving member carries a spring pressed driving plunger 307 that engages in a system of tracks or grooves formed in a sleeve-like member 308 that is freely rotatable on the shaft 306 and is endwise shiftable thereon. The track system of the member 308 is fully described in said Curtis and Schoepe application Serial No. 485,980 now Patent No. 2,424,153 and it need merely be stated herein that said system includes portions which cooperate with the driving plunger 307 to cause the sleeve to rotate with the driving member 305 or with stopping and shifting plungers 309 and 310 that operate when positioned with their ends in the grooves of the member 308 to either shift said member axially to cause the plunger 307 to drive the member or to shift said member axially to disengage its driving relationship with the plunger 307. The plungers 309 and 310 also function to stop the rotation of the member 308 in a predetermined position to stop the movement of the turret slide at a predetermined position, all as fully explained in said copending application Serial No. 485,980 now Patent No. 2,424,153.

The member 308 is provided with a gear 311 which meshes with the wide faced gear 289 on the shaft 286 which has its forward end threadingly engaged with a nut carried by the turret slide, and hence when said member 308 is driven by the plunger 307 the shaft 286 will be driven through the gears 311 and 289 and movement will be imparted to the turret slide. The shaft 306 has freely rotatable on it gears 312 and 313, the purpose of which will later be explained.

The plungers 309 and 310 are operated by means of a rockable lever 314 which is connected to a slidable rod 315 that carries spaced arms 316 which cooperate with dogs 316a on a control drum forming part of the main control mechanism and located at the foot end of the machine in the bed.

*Main control mechanism unit*

The gear 312 which is freely rotatable on shaft 306 meshes with gear 303 fixed on shaft 286 and also with gear 317 that is freely rotatable on the sleeve portion 318 of indexing cams 319. Said sleeve 318 and indexing cams 319 are freely rotatable on a fixed shaft 320. The gear 317 meshes with a gear 321 that is freely rotatable on a shaft 322 and is provided with a clutch portion 323 adapted to be engaged with a clutch member 324 that is splined on the shaft 322 with its axial movement relative to said shaft limited by a pin 325 fixed in the box which houses the control mechanism and engaging in an annular groove 326 in the clutch member 324. It will be seen that when the clutch member 324 is moved axially in one direction it will be engaged with the clutch portion 323 of the gear 321 and hence the rotation of said gear will cause driving rotation of the shaft 322. The clutch member 324 is provided exteriorly of the control mechanism housing box with an enlarged head 327 which enables the operator to move the clutch member 324 manually to engaged or disengaged position with respect to the clutch portion 323. The clutch member 324 is provided with a second annular groove having an inclined front wall indicated at 328. A spring pressed plunger 329 extends into the groove 328 when the clutch member is engaged with the clutch portion 323. When the clutch member 324 is moved to disengaged position the inclined wall of the groove depresses the plunger and said plunger is operatively connected with the switch button of a safety switch ALS1 which is in the control circuit and hence the contacts of said switch are opened to interrupt the entire control circuit as will later be explained in connection with the diagrams. Also the plunger 329 functions to hold the clutch member 324 in clutch engaged position.

The shaft 322 in addition to being supported by the clutch member 324 has its opposite end rotatably supported in a bearing boss 330 formed in a wall of the bed. The shaft 322 has a threaded portion 331 with which a nut 332 cooperates, said nut being held against turning movement by a depending forked arm which straddles a stationary rod 333 fixedly mounted in the bed. It will be seen that rotation of the shaft 322 causes the nut 332 to move axially with respect thereto.

The nut 332 forms a bearing for the end wall 334 of a main control drum which is polygonal in shape and has the same number of sides as the number of faces on the turret. This control drum comprises a portion 335 of relatively small diameter as compared to the diameter of a larger portion 336. The control drum moves axially of the shaft 322 with the nut 332 and is slidably and rotatably supported on a surface of the bed indicated in Fig. 16 at 337.

From the foregoing it will be seen that the shaft 322 rotates in timed relation with the shaft 286 and hence the main control drum will move axially in timed relation to the movements of the turret slide. The main control drum is indexed in correlation to the indexing of the turret in the manner now to be described.

The sleeve 318 on which the gear 317 freely rotates has fixed to it a gear 338 which meshes with the gear 313 that in turn meshes with the gear 302 freely rotatable on shaft 286 and which latter gear meshes with the gear 301 that is driven by the shaft 293 through the magnetic clutches on said shaft (see Figs. 15 and 16). Hence the sleeve 318 is indexed in correlation to the indexing of the turret 45.

The cams 319 on the sleeve 318 are identical cams but are invertedly carried by said sleeve and are circumferentially displaced with respect to each other approximately 90° (see Figs. 16 and 20). One of the cams 319 cooperates with a series of five equally spaced rollers 339 on one side of an indexing plate 340. The other cam 319 cooperates with a similar series of rollers 339 on the other side of the index plate 340. The cams 319 each have index plate actuating or driving portions and index plate restraining portions, the driving portions of one cam functioning when the restraining portions of the other cam are active, all as more fully described in my copending application Serial No. 684,594, filed July 13, 1946 now Patent No. 2,560,686, granted July 17, 1951. Each indexing movement of the turret imparts a full rotation to the sleeve 318 and to the cams 319 and hence a fifth of a complete rotation to the index plate 340. The periphery of one of the cams 319 is in engagement with a spring pressed plunger 319a that is operatively associated with the actuating button of a switch ILS4–1 and hence said cam controls the actuation of said switch for purposes later to be pointed out. The index plate 340 is carried by a sleeve 341 that is freely rotatable on the shaft 322 and is provided at its end opposite to the index plate 340 with a plate 342 that carries a pin 343 that is always aligned with one of five openings 344 in the end plate 334 of the main control drum for every indexed position of said drum.

When the control drum 335 is in the position shown in Fig. 16, i. e., the position it occupies when the turret slide is in indexing position, the pin 343 extends into the opening 344 and hence the rotation of index plate 340, sleeve 341 and plate 342 one-fifth of a turn imparts a similar turning or indexing movement to the main control drum. When the main control drum 335 moves axially of the shaft 322 from the position shown in Fig. 16 toward and to the position shown in Fig. 17 the pin 343 disengages from said one opening 344 but remains in alignment therewith and in this indexed position of the control drum the rod 333 passes through said one opening 344 or through another of said openings depending upon the indexed position of the control drum.

Although the pin 343 always operates in the same opening 344 to index the control drum, it will be understood that the end plate 334 of said drum is provided with four additional openings to accommodate the rod 333 during the axial movement of the control drum in each of its five indexed positions. Hence the rod 333 in addition to holding the nut 332 against rotation also locks the control drum against rotation during its axial movement.

Each of the five faces of the larger portion 336 of the control drum is provided with a plurality of axially extending slots 345, there being eight of these slots in the particular machine illustrated herein (see Figs. 16, 17 and 18). Similarly, each of the five faces of the smaller portion 335 of the control drum is provided with a plurality of axially extending slots 346 (see Fig. 19). The slots 345 and 346 are adapted to adjustably mount various types of dogs as, for instance, continuous dogs 347 and overrunning dogs 348, and which dogs actuate during the axial movements of the drum in its various indexed positions predetermined control switches located internally of the drum.

The supporting portion 337 of the bed which extends into the control drum mounts an upper bank of switches TLS12–1, TLS10–1, TLSF–2 and TLSF–4 and a lower bank of switches TLS6–1, TLSF–1, TLSF–3 and VLS1. The switches of these two banks of switches are actuated by the dogs carried on the faces of the larger portion 336 of the drum through the intermediary of a series of levers 349 pivotally supported in position to be engaged by the dogs and momentarily depressed thereby or continually held depressed thereby during the axial movement of the drum. The dogs mounted in the slots 346 of the smaller portion 335 of the control drum are adapted during axial movement of the drum to actuate switches TLS0, TLS–1 and TLS–2 and also three additional or extra switches which might be used under varying circumstances and which would be used in case the machine was designed to have a greater number of automatic spindle speeds. The switches just referred to are actuated by the dogs on the faces of the smaller portion 335 of the drum by means of a series of pivoted bell crank levers 350 which are rocked by the dogs and which engage the buttons of the switches as clearly indicated in Figs. 16 to 19 inclusive. The functions of the switches which are actuated by the dogs on the various faces of the control drum will be explained in detail during the description of the wiring diagrams later to be set forth.

It will be noted that the dogs which are adjustably mounted in the grooves of the control drum faces have manual adjusting knobs and do not require wrenches to effect adjustment thereof but can be finger-adjusted by the operator.

The end plate 334 of the control drum has mounted on its outer side a ring 351 provided with cam inserts which when the control drum approaches and is in its most right hand position engage a roller 352 mounted on one end of a switch actuating rod 353 which is slidably supported in the bed and is normally urged toward the left, as viewed in Figs. 16, 17 and 22, by a spring 354 (see Fig. 22). The cam inserts on the ring 351 may be all identical or some or all may be different from each other depending upon the operations to be performed by the machine. In the present illustration three different cam inserts are shown, namely, 351a, 351b and 351c (see Figs. 22, 22a, 22b and 22c). The cam inserts are spaced circularly on the ring 351 and are brought into operative position by the indexing of the main control drum. The rod 353 is provided in one side thereof with four notches, the bottoms of which include a straight wall portion and an inclined wall portion. Normally open switches ILS1–1 and ILS1–2 and ILS2–1 and a normally closed switch ILS2–2 are located adjacent to the rod 353 and have their switch buttons engaged by spring pressed plungers 355 which extend into the notches in the actuating rod 353. When the control drum has moved toward the left so that the ring 351 and its cam inserts are free of the roller 352 (see Fig. 17) all of the actuating plungers 355 have their outer ends engaging the straight bottom portion of the grooves in the rod 353 and hence switches ILS1-1, ILS1-2 and ILS2-1 are open and switch ILS2-2 remains closed, said rod 353 then being in position 1 (Fig. 22).

When the main control drum is in its most right hand position the plane of the right hand side of the ring 351 will be so located as to have engaged the roller 352 and moved the rod toward the right from position 1 to position 2. If the particular cam insert corresponds to insert 351a of Fig. 22a or 351c of Fig. 22c then the position of the rod 353 will be the No. 2 position. However, if the cam insert extends beyond the plane of the right hand side of the ring as, for instance, cam insert 351b of Fig. 22b then the position of the rod will be at No. 3 position. When the rod 353 is in No. 2 position normally open switches ILS1-1 and ILS1-2 will be closed while normally open switch ILS2-1 remains open and normally closed switch ILS2-2 remains closed. In the No. 3 position of rod 353 normally open switches ILS1-1 and ILS1-2 remain closed while normally open switches ILS2-1 remains open and normally closed switch ILS2-2 is opened. The rod 353 is only moved to No. 4 position when the main control drum is indexed and when the particular cam insert which is in engagement with the roller 352 is of the type shown in Figs. 22b and 22c. Prior to the indexing movement of the main control drum the roller 352 will rest on the low portion of the cams 351b or 351c and hence will be in either position 3 or position 2, respectively, as the case may be, but during the last part of the indexing movement of the drum the roller 352 rides up the cam insert to the high portion thereof until it is in the No. 4 position and then as the indexing movement continues the roller rides off the high portion of the insert and onto the lower portion of cams 351b or 351c. When the indexing movement is completed the roller will be engaging in the cam insert carried by the ring. When the roller 352 and rod 353 are in the No. 4 position normally open switches ILS1-1 and ILS1-2 which are closed in positions 2 and 3 remain closed in position 4, while normally open switch ILS2-1 which is open in positions 2 and 3 is momentarily closed in position 4. Also normally closed switch ILS2-2 which is open in position 3 remains open in position 4.

It will be understood that when the drum moves toward the left and the ring 351 and its inserts move out of engagement with the roller 352 the rod 353 returns to No. 1 position under the action of the spring 354. The purpose of the construction just described will become more apparent hereinafter.

The indexing plate 342 has mounted thereon five cams with each cam correlated to an indexed position of the plate of the control drum and turret. It will be understood that the five cams are spaced circumferentially of the plate 342 and reference to Figs. 16 and 21 will show graduations numbered 1, 2, 3, 4 and 5 representing the effective operative positions of the cams as the plate is indexed. The four types of cams used in the illustrated embodiment of the invention are designated as cams 356, 356a, 356b, 356c in Figs. 21, 21a, 21b, 21c and 21d.

The indexing movement of the plate 342 causes the cams just referred to to effect predetermined rocking movement of a pivoted lever 357. Said lever 357 has a rounded end located in a slot formed in a slidable rod 358 and the rocking of the lever 357 effects endwise movement of said rod. The rod 358 is normally urged in one direction by a spring 359 and the cams act to rock the lever 357 to move said rod in the opposite direction and against the action of said spring. Although the cams shown herein are different from each other for purposes of illustration it will be understood that in some instances, depending upon the work to be performed by the machine, two or more of these cams may be identical or the cams may vary in any desired manner.

It will be noted that when cam 356 is contacting the lever 357 and said lever is in position 1 of Figs. 16 and 21 none of the switches TLS7-1, TLS8-1 and TLS8-2, TLS11-1, TLS9-1 and TLS9-2 with which the rod 358 cooperates are actuated since the free ends of the actuating plungers 360 of said switches are all in the deep portions of the five notches formed in the upper side of the rod 358. Switch TLS7-1 is a normally open switch while the single pole double throw switch TLS8-1 is normally closed and TLS8-2 is normally open. Switches TLS11-1 and TLS9-1 are normally closed switches, while switch TLS9-2 is a normally open switch.

Assuming that plate 342 indexes to bring cam 356a into contact with the lever 357 the rod 358 is shifted to No. 2 position. Switches TLS7-1, TLS8-1 and TLS8-2 and also TLS11-1 are not effected, while normally closed switch TLS9-1 is opened and normally open switch TLS9-2 is closed. When the plate 342 indexes to bring cam 356b into contact with the lever 357, the lever 357 rides up the high point of the cam 356b and at said high point of the cam 356b the rod 358 is in the #5 position actuating all the switches. When the indexing is completed the rod drops into #3 position, and in this position it does not affect actuation of switches TLS7-1, TLS8-1 and TLS8-2, but does cause actuation of normally closed switch TLS11-1. Normally closed switch TLS9-1 remains open and normally open switch TLS9-2 remains closed since their plungers remain out of notches and ride on the outer surface of the rod 358. When the plate 342 indexes to bring cam 356c into contact with the lever the lever 357 rides up into position 5 momentarily closing TLS7-1 and then drops to position 4, at which time normally open switch TLS7-1 remains open while the single pole double throw switch TLS8-1 and TLS8-2 is actuated to open contacts 1 and close contacts 2. At this time switches TLS11-1, TLS9-1 and TLS9-2 which have been previously actuated continue to function in their actuated condition since their plungers are engaging the outer surface of the rod 358. When the plate 342 indexes from position 4 to position 1 and the lever 357 moves out of contact with cam 356c and into contact with the cam 356, the spring 359 returns the rod 358 to position 1 and the switches associated with the rod are actuated in the converse manner from that described with respect to the movement of the rod under the action of the cams. The purpose of the switches associated with the rod 358 will be pointed out in the description of the diagrams later to be set forth.

A mechanism is operatively associated with the driven member 398 of the clutch or connecting and positioning device on the shaft 336 to provide for a predetermined dwell period of the turret slide at the end of its feeding movement. This mechanism is identical in function and is substantially identical in structure with the mechanism described in my copending application Serial No. 643,029 filed January 24, 1946 now Patent No. 2,519,117, granted August 15, 1950 and covering a dwell timing device. In view of the complete disclosure in my said application Serial No. 643,029 now Patent No. 2,519,117 the dwell timing mechanism illustrated herein need only be briefly described.

The driven member 308 of the connecting and positioning device is provided with an annular groove 361 in which are located shoes carried by a fork 362 which straddles the member 303 (see Fig. 16). The fork 362 is rigidly connected to a slidably supported rod 363 and said rod adjacent its free end is provided with an elongated slot 364. The free end of a lever 365 is located in said slot 364 while the other end of said lever is fixed to a shaft 366.

In Fig. 16 the parts are shown in the relationship they have when the driving plunger 307 is in driving position with respect to the driven member 308 and at this time the gear 311 is midway of the elongated gear 289 while the free end of lever 365 is midway of the ends of the slot 364.

In Fig. 16 the turret slide is at the start of its forward movement. When the turret slide reaches the end of its forward or feeding movement the lever 314 is rocked by the rod 315, arm 316 and left hand dog 316a from the position shown in Fig. 16 to the position shown in Fig. 16a, whereupon the plunger 309 is fully inserted into the track grooves of the driven member 308 and the continued rotation of said member causes it to shift toward the left from the position shown in Fig. 16 to the position shown in Fig. 16a until its rotation is stopped in predetermined position by the plunger 309, all as fully described in the said copending application of Curtis and Schoepe Serial No. 485,980 now Patent No. 2,424,153. This shifting movement of the driven member 308 toward the left moves the rod 363 to bring the right hand end as viewed in the drawings of the slot 364 into engagement with the free end of the lever 365 and to impart rocking movement of said lever in a clockwise direction. This rocking movement of the lever and of the shaft 366 to which it is attached rocks plate 367 from the position of Fig. 16 to the position of Fig. 16a. The plate 367 is operatively connected to a switch PLS1-1 and said rocking movement of the plate actuates said switch to condition the turret indexing control circuits as will later be explained.

The plate 367 is also operatively connected with switches PLS2-1 and PLS2-2 and the rocking movement of the plate at the end of the feed stroke functions to actuate said switches to open contacts 1 thereof and close contacts 2. Said switches PLS2-1 and PLS2-2 partially condition the control circuit to determine the direction of movement of the turret slide. These switches function in conjunction with switches PLS3-1 and PLS3-2 which are actuated at a predetermined interval subsequent to the actuation of switches PLS2-1 and PLS2-2, said interval representing the dwell period of the turret slide at the end of the feed stroke.

The switches PLS3-1 and PLS3-2 are slidably and adjustably mounted on rods 368 supported by certain of the ribs of the bed. The switches PLS3-1 and PLS3-2 are provided with an actuating lever 369 which extends between spaced pins 370 carried by the plate 367. It will be seen that the rocking movement of the plate 367 causes one or the other of the pins 370 as the case may be to engage and move the actuating lever 369 to actuate the switches PLS3-1 and PLS3-2. It will be seen that if said switches are adjusted toward or away from the plate 367 the effective radius of the actuating lever 369 will be changed. In order to rock the lever 369 through the required angle to actuate the switches PLS3-1 and PLS3-2, the plate 367 must rock through a greater angle when said switches are adjusted in a position away from said plate and through a smaller angle when the switches are located in a position close to the plate. It should be noted that the plate 367 is rocked in a similar manner each time the turret slide completes its feeding movement and the greater or lesser rocking movement of the plate will result in the actuation of the switches PLS3-1 and PLS3-2 at a later or earlier movement and hence the interval between the actuation of switches PLS2-1 and PLS2-2 and switches PLS3-1 and PLS3-2 by the rocking of the plate 367 may be varied.

In order to adjust the switches PLS3-1 and PLS3-2 to vary this radius said switches are connected to a slidable rod 371 which is illustrated as provided adjacent its left hand end, as viewed in the drawings, with rack teeth 372 that engage a pinion 373 fixed to a shaft 374. Said shaft is rotatably supported by a stationary plate 375 and has fixed to it an adjustable actuating plate 376 which can be swung to various predetermined positions relative to the plate 375 to rock the shaft 374, pinion 373 and to shift the rod 371 to adjust the position of the switch PLS3-1 and switch PLS3-2. Said plate 376 is provided with an operating knob 377 and pointer 378 which cooperates with a curved scale 379 on the plate 375 to indicate the adjusted position in terms of dwell period of the plate 376. The plate 376 may be locked in its adjusted position by means of a lock screw 380 carried by the plate 375 and extending through a curved slot 381 in the plate 376.

As already stated, the function of the mechanism for providing a predetermined dwell for the turret slide is fully explained in my said copending application Serial No. 643,029, now Patent No. 2,519,117. The switches PLS2-1 and PLS2-2 and PLS3-1 and PLS3-2 are of the maintained contact type and hence remain in the actuated condition they have in Fig. 16a and until they are again actuated by the movement of the rod 363 toward the right from the position shown in Fig. 16a to the position shown in Fig. 16b. This movement of the rod 363 occurs at the end of the return stroke of the turret slide when the right hand fixed dog 316a of the control drum engages the right hand arm 316 to shift the rod 315 to rock the lever 314 to the position of Fig. 16b to effect withdrawal of the plunger 309 and full insertion of the plunger 310 to cause the driven member 308 to shift toward the right to render the driving plunger 307 ineffective and to positively stop the rotation of the driven member 308 by the plunger 310. This shifting movement of the driven member 308 toward the right shifts the rod 363 in a similar direction until the left hand end of the slot 364 rocks the lever 365 to rock the plate 367 from the position shown in Fig. 16 to the position shown in Fig. 16b, it being understood that at the start of the return movement of the turret slide the rod 363 and the lever 365 assume the relationship shown in Fig. 16.

When the parts are in the position shown in Fig. 16b the plate 367 has moved anti-clockwise to actuate switch PLS1-1 and to close contact 1 and open contact 2 of switch PLS2-1 and PLS2-2 and then to actuate switch PLS3-1 and PLS3-2 to close contact 1 and open contacts 2 thereof.

As already stated, a control panel 40 is mounted on the front side of the headstock, as indicated in Fig. 1. Referring to Fig. 23 said control panel is shown in detail and it will be seen that this panel contains push button 382 for the manually actuated feed switch of the front cross slide. Below the button 382 is push button 383 for the manually actuated fast ahead switch of the front cross slide control. Also the panel contains push button 384 for the manually actuated fast reverse switch of the front cross slide control.

The push buttons 382, 383 and 384 are arranged in a vertical series and the panel 40 contains two similar series of push buttons for the rear cross slide control and the turret slide control for the series including, respectively, push buttons 385, 386 and 387 for the rear cross slide and push buttons 388, 389, and 390 for the turret slide. The panel 40 mounts selector switch knobs 391 for the coolant control, 392 for the spindle speed control, 393 for the hand or automatic control, 394 for the spindle control and 395 for the turret feed selector.

The knob 391 of the coolant selector switch has two operative positions, the knob 392 for the spindle speed selector switch has four operative positions, the knob 393 of the hand-automatic selector switch has three operative positions, the knob 394 of the spindle control selector switch has three operative positions and the knob 395 of the turret slide feed selector switch has four operative positions. In addition the panel 40 mounts push button 396 for the manually actuated turret index switch, push button 397 for the manually actuated cycle start switch, push button 398 for the manually actuated main motor start switch and push button 399 for the manually actuated main motor stop switch.

Referring to Fig. 25 it will be noted that in the hand feed selector switch controlled by the knob 395 only one set of contacts of said switch is closed in each operative position of the knob.

Referring to Fig. 27 it will be seen that in the manual spindle control switch only one set of contacts is closed in each operative position of the knob 394, it being noted, however, that when said knob is in the jog position the switch is spring returned from the jog to off position as soon as the operator releases the knob 394.

Referring to Fig. 26 it will be noted that when the knob 393 of the hand automatic selector is in hand position then five hand or HR contacts of said switch are closed, namely, contacts HR1, HR-2, HR-3, HR-4 and HR-5 in wires 474, 473, 459, 487 and 440, respectively. When the knob 393 is in the automatic position the eleven AR contacts are closed. When the knob 393 is in the semi-automatic position said eleven AR contacts are closed and in addition contact SAR is closed.

When knob 392 of the spindle speed selector switch is in position 1 both of contacts HS1 and HS2 of said switch are open, see Fig. 24. When said knob is in position 2 contacts HS2 are closed and contacts HS1 are open, while when said knob is in position 3 the reverse arrangement obtains. When the knob is in position 4 both contacts HS-1 and HS-2 are closed.

The diagram of Fig. 28 is the power circuits to the various motors of the machine. The lines from the power source are indicated at L1, L2 and L3 and said lines are connected to or disconnected from wires 400, 401 and 402 by the main disconnect switch DS. The main motor 42 is connected to the power line 400, 401 and 402 by wires 403, 404 and 405 which contain the contacts MM-1, MM-2 and MM-3 of the main motor contactor MM.

The auxiliary motor 406 for the generator 407 and for the pump 142 of the hydraulic circuit is connected to the power circuit by wires 408, 409 and 410 which include the contacts AM-1, AM-2 and AM-3 of the auxiliary motor contactor AM.

The output of the generator 407 is through wires 411 and 412 which are shown in Fig. 29 in connection with the D. C. circuit to the magnets of the magnetic clutches. The front cross slide rapid traverse motor 171 is connected to the power circuit for the forward operation by wires 413, 414 and 415 which contain contacts 1CA-1, 1CA-2 and 1CA-3 of contactor 1CA. This motor 171 is connected to the power circuit for reverse operation by wires 416, 417 and 418 which contain contacts 1CR-1, 1CR-2 and 1CR-3 of contactor 1CR.

The rear cross slide rapid traverse motor 192 is connected to the power circuit for forward operation by wires 419, 420 and 421 which contain contacts 2CA-1, 2CA-2 and 2CA-3 of contactor 2CA. This motor 192 is connected to the power lines for reverse operation by wires 422, 423 and 424 which contain contacts 2CR-1, 2CR-2 and 2CR-3 of contactor 2CR. The rapid traverse turret motor 283 is connected to the power line for forward operation by wires 425, 426 and 427 which contain contacts TA-1, TA-2 and TA-3 of contactor TA. The motor 283 for reverse operation is connected to the power line by wires 428, 429 and 430 which contain contacts TR-1, TR-2 and TR-3 of contactor TR.

The wires 400 and 402 of the power line extend to the input side of the transformer TF, the output side of which transformer is connected to the wires 431 and 432 of the control circuit shown in Figs. 30, 31 and 32.

Referring now to Fig. 29 which is a diagram of the D. C. circuit to the magnets of the magnetic clutches and the solenoids, it will be seen that the wires 411 and 412 are connected to the solenoids of the spindle transmission solenoids as follows, and which solenoids are shown in Figs. 5 to 7 inclusive.

Solenoids SC1 and SB1 are connected across the lines 411 and 412 of the D. C. circuit by wires 433 and 434 containing, respectively, normally open contact SR1-1 and normally closed contact SR1-2 and by wire 435 containing normally open contact SP-1. Solenoid SC2 is connected across the lines 411 and 412 by wire 436 containing normally open contact SR2-1 and also through normally closed contact SP-2 which is in parallel with normally open contact SR2-1. Solenoid SB2 is connected across the lines 411 and 412 by wire 437 containing normally closed contact SR2-2 and also through normally closed contact SP-3 which is in parallel with normally closed contact SR2-2.

It will be noted that solenoids SC1 and SB1 are normally deenergized due to normally open contact SP-1 while solenoids SC2 and SB2 are normally energized due to normally closed contact SP-2 and normally closed contacts SP-3 and SR2-2.

It will be recalled that when solenoids SC2 and SB2 are energized both of the clutches on the shaft 95 in the spindle transmission are engaged and hence the spindle 38 is held against rotation.

The magnet FC1 of the turret drive train clutch that is on the shaft 255 is connected across the lines 411 and 412 by wire 438 in which is located normally open contact FR1-1. Wire 438 is connected intermediate its ends to wire 411 by wire 439 containing contact HF-1 of hand feed selector switch HF with said wire 439 in turn connected to wire 440 containing contact HR-5 of the hand automatic selector switch.

Magnet FC2 of the clutch on shaft 255 is connected across the lines 411 and 412 by wire 441 in which is located normally open contact FR2-1. The wire 441 is connected to the wire 440 by wire 442 containing contact HF-2 of the hand feed selector switch HF. The magnet FC3 of the clutch in the turret slide drive train which is on the shaft 255a is connected across the lines 411 and 412 by wire 443 containing normally open contact FR3-1 with said wire 443 being connected to wire 440 by wire 444 containing contact HF-3 of the hand feed selector switch HF. Magnet FC4 of the clutch on shaft 255a is connected across the lines 411 and 412 by wire 445 which contains normally open contact FR4-1. The wire 445 is also connected to wire 440 by wire 446 containing contact HF-4 of hand feed selector switch HF.

The magnet 1CC of the front cross slide clutch is connected across the lines 411 and 412 by wire 447 containing normally open contact 1CF-1. Magnet 1CB of the front cross slide clutch is connected across the lines 411 and 412 by wire 448 which contains normally closed contacts 1CR-4, 1CF-2 and 1CA-4. Magnet 2CC of the rear cross slide carriage is connected across the lines by wire 449 which contains normally open contact 2CF-1. Magnet 2CB of said rear cross slide carriage is connected across the lines 411 and 412 by wire 450 containing normally closed contacts 2CR-4, 2CF-2 and 2CA-4.

The magnet TC of the clutch on the shaft 276 in the drive train to the turret slide is connected across the lines 411 and 412 by wire 451 which contains normally open contact TF-1. The magnet TB for braking the pinion carrier 280 and shaft 281 in the drive train to the turret slide is connected across the lines 411 and 412 by wire 452 which contains normally closed contacts TR-4, TA-4 and TF-2.

The magnet IC of the turret index clutch is connected across the lines 411 and 412 by wire 453 which contains normally open contact IR-3. The brake magnet IB of said turret index clutch is connected across the lines 411 and 412 by wire 454 which contains normally closed contact IR-4.

From the foregoing it will be noted that magnets 1CB, 2CB, TB and IB are normally energized and hence the respective drive trains in which said magnets are located are normally held against rotation.

The switch KLS1-2 which is controlled by the door 41 to the compartment in the head end of the bed is located in wire 411 at a point such that when said switch is opened the cross slide clutches, the turret drive clutch and the turret index clutch and the brakes associated with said clutches are inactive and hence the cross slides and the turret slide during the time said door is open cannot be power driven or the turret power indexed. It will be noted, however, that the spindle transmission solenoids and the magnets of the turret feed selector clutches can be energized at such time.

As already stated, the main control circuit is illustrated in Figs. 30, 31 and 32 and said figures are to be considered as constituting a single diagram. As stated in connection with the description of Fig. 28 the output side of the transformer TF is connected to the wires 431 and 432 of the control circuit.

The coil AM for the contactor AM in the power circuit is connected across the wires 431 and 432 by wire 455 in which the switch for the auxiliary motor 406 is located.

The coil MM of the contactor MM for the main motor 42 is connected across the wires 431 and 432 by wire 456 which contains normally open contact MM-4. Wire 457 connected to wire 456 contains the motor start switch that is actuated by the push button 398 on the panel 40. The wire 457 also contains the spindle "off" contacts of the spindle control switch that is actuated by the selector knob 394 on the control panel 40. The start switch and the spindle "off" contacts in wire 457 are in parallel with contact MM-4 in wire 456. The wire 431 intermediate its points of connection to the wire 455 and 456 contains normally closed pressure switch PS which is controlled by the pressure in the hydraulic circuit, it being recalled that when the pressure in said circuit falls below a predetermined point said switch opens and renders the control circuit for the slides and spindle inactive. The wire 431 intermediate said pressure switch and its point of connection to the wire 456 contains the main motor stop switch which is actuated by the push button 399 on the panel 40. The relay SP is connected across the wires 431 and 432 by wire 458 containing the spindle jog contacts of the spindle control switch that is actuated by the selector knob 394 on the panel 40.

Wire 459 is connected to wire 431 and to the wire 458 intermediate relay SP and said spindle jog contacts and said wire 459 contains contacts HR-3 of the hand automatic selector switch 393 and contacts of the spindle control switch 394, both of said last two contacts being in parallel with the spindle jog contacts of said spindle control switch.

Wire 458 is connected to wire 460 and wire 459 to wire 461. Wire 461 contains normally open contacts AR-1 of the hand automatic selector switch that is actuated by the selector button 393 on the panel 40. Wire 460 and 461 are interconnected by wire 462 containing normally open contacts TR-5 and SAR-1, wire 463 containing normally open contacts TF-3, wire 464 containing normally open contacts ICF-3 and wire 465 containing normally open contacts 2CF-3. Normally open contacts TA-5 in wire 466 are in parallel with normally open contacts TR-5 in wire 462.

Normally open contacts MM-5 are located in wire 431 between wires 456 and 458 while switch ALS1 is located in wire 431 intermediate said contacts MM-5 and wire 458, it being recalled that said switch ALS1 is controlled by the axial movement of the clutch member 327 on shaft 322 in the drive to the main control drum.

Relay SR0 is connected across wires 431 and 432 by wire 467 which contains normally open contacts AR-2 of the hand automatic selector switch 393, normally closed contacts TR-6 and limit switch TLS0 that is in the control drum.

Wire 468 is connected to wire 467 between contacts AR-2 and TR-6. Relay SR1 is connected to wire 468 and 432 by wire 469 which contains limit switch TLS1 located in the control drum and normally open contacts SR0-1. Relay SR2 is connected to wire 468 and wire 432 by wire 470 which contains limit switch TLS2 and normally open contacts SR0-2.

The wire 470 intermediate the relay SR2 and contacts SR0-2 is connected to wire 468 by wire 471 which contains normally open contacts AR-3 and SR2-3 and normally closed contacts SR0-3. Wires 469 and 471 are interconnected by wire 472 which contains normally open contacts SR1-3 and normally closed contacts SR0-4. The wire 470 intermediate the point of connection of the wire 471 thereto and the relay SR2 is connected to a wire 473 that is connected to wire 431 and contains contacts HS-2 of the hand operated spindle speed selector switch and contacts HR-2 of the hand automatic selector switch.

The wires 473 and 469 are connected by wire 474 which contains contacts HS-1 of the hand operated spindle speed selector switch and HR-1 of the hand automatic selector switch. The wire 431 is connected to wire 475 extending from Fig. 30 on to Fig. 31 to which reference will now be made. Relay FR1 is connected to wire 468 and 432 by wire 476 containing limit switch TLSF1 located in the main control drum. Wire 477 connects the wire 476 intermediate the relay FR1 and said switch TLSF-1 with wire 468 and contains normally closed contacts FR2-2, FR3-2, FR4-2 and normally open contact FR1-2. Relay FR2 is connected to wires 468 and 432 by wire 478 containing limit switch TLSF-2 located in the main control drum. Between said relay and said limit switch the wire 478 is connected to wire 468 by wire 479 which contains normally closed contacts FR1-3, FR3-3, FR4-3 and normally open contact FR2-3. The relay FR3 is connected to the wires 468 and 432 by wire 480 that contains limit switch TLSF3 carried by the main control drum. Intermediate said relay and said limit switch the wire 480 is connected to wire 468 by wire 481 containing normally closed contacts FR1-4, FR2-4, FR4-4 and normally open contacts FR3-4. The relay FR4 is connected to the wires 468 and 432 by wire 482 which contains limit switch TLSF-4 located in the main control drum. Said wire 482 intermediate said relay and said limit switch is connected to the wire 468 by wire 483 containing normally closed contacts FR1-5, FR2-5 and FR3-5 and normally open contacts FR4-5.

The front cross slide fast ahead and the front cross slide reverse circuits extend across the lines 431 and 432 and comprise the wire 484 connected to the wire 431 and to the parallel wires 485 and 486 which are connected to the wire 432. The wire 485 contains the relay coil 1CA and the normally closed contacts CLR-2 of the latch relay CLR. Wire 485 also includes limit switch 1CLS4-1 in switch box 202 and limit switch 1CLS1-1. The contact 1CLS1-2 is in parallel wire 486 in which also is contactor coil 1CR. Wire 485 also contains switch TLS6-1 which is located in the main control drum of the machine. Switch 1CLS3-1 in switch box 202 is connected to wire 485 in parallel with the switch TLS6-1. Wire 486 contains normally open contacts AR-4 of the hand automatic selector switch and normally closed contacts of the front cross slide feed selector switch which is actuated by the push button 382 on the control panel 40. The switch PLS1-1 which is controlled by the door 41 of the cross slide control is located in wire 431 intermediate wire 473 and wire 484. A wire 487 is connected to the wire 431 between switch KLS1-1 and wire 484 and extends to wire 488. In the wire 487 are the normally open contacts HR-4 of the hand automatic selector switch. The wire 488 is connected to wire 432 by wire 489 containing the normally open contacts of the front cross slide feed selector switch that is actuated by the button 382. The wire 489 also contains contactor coil 1CF and normally closed contacts 1CA-5 and 1CR-5.

It will be noted that the normally closed contacts and the normally open contacts of the feed selector switch for the front cross slide are mechanically interlocked. The wires 489 and 485 are connected by wire 490 in which the normally open contacts AR-5 of the hand automatic selector switch are located. The wire 485 is connected to wire 488 by wire 491 which contains the normally open contacts of the fast ahead switch for the front cross slide that is actuated by the push button 383 of the control panel 40.

Intermediate the points of connection of the wire 488 with the wires 487 and 491 said wire 488 contains limit switch 1CLS6 that is located in the switch box 202. The wire 488 is connected to wire 486 by wire 492 containing limit switch 1CLS7 in switch box 202 and the normally open contacts of the fast reverse selector switch for the front cross slide that is actuated by the push button 384 on panel 40. The wire 493 connects wire 475 and 432 and contains the pick-up coil of the latch relay 1CLR and switch TLS7-1 located in the main control drum. The wires 488 and 432 are interconnected by wire 494 which contains the release coil of the latch relay 1CLR and also the normally open contacts 1CR-6, it being noted that normally open contacts 2CR-5 are in parallel with said normally open contacts 1CR-6. The wire 494 contains the normally closed contacts of the fast reverse selector switch for the front cross slide and which contacts are mechanically interlocked with the normally open contacts of said switch located in wire 492. The wire 494 also contains the normally closed fast reverse selector switch for the rear cross slide that is actuated by the push button 387 on the control panel 40.

The wire 431 is connected by wire 495 to wire 496 which latter wire is connected to wire 432, see Fig. 32, and contains turret reverse contactor coil TR. Wire 495 contains normally open contacts AR-6 of the hand automatic selector switch and also normally closed contacts 2CR-6, 1CR-7 and CLR-1. Switch TLS11-1 located in the main control drum is in the circuit in parallel to the last mentioned normally closed contacts. Normally open contacts of dwell timing switch PLS3-2 are in the wire 495 while in parallel with said contacts of said switch are normally open contacts of switch PLS2-2 and normally closed contacts of switch TLS9-1, both of said last mentioned contacts being in series with each other in wire 497 connected to wire 495. Wire 495 is connected to wire 485 by wire 498 containing normally open contacts CLR-4 and the normally closed contacts of switches TLS8-1 and 1CLS5-1. Wire 495 intermediate normally open contacts AR-6 and normally open contacts of switch PLS3-2 is connected to wire 496 by wire 499. The latter wire contains normally open contacts 1R-2. Wires 431 and 432 are interconnected by wire 500. The wire 500 contains normally closed contacts of the feed selector switch for the rear cross slide and which switch is actuated by the button 385 on the control panel 40. Also in wire 500 are normally open contacts AR-7 of the hand automatic selector switch that is actuated by the knob 393 on the control panel.

The normally closed contacts of switch 2CLS1-1 are in the wire 500, while the normally open contacts of the parallel switches TLS10-1 and 2CLS3-1 are in said wire. In addition the normally closed contacts of switch 2CLS4-1, the normally closed contacts of CLR-3 and relay coil 2CA are in the wire 500. The wire 500 intermediate the normally open contacts AR-7 and the normally closed contacts of switch 2CLS1-1 is connected to wire 432 by wire 501 containing normally open contacts of switch 2CLS1-2 which are mechanically interlocked with the contacts of switch 2CLS1-1.

Wire 501 also contains contactor coil 2CR of the rear cross slide reverse contactor. The wire 500 intermediate normally closed contacts CLR-3 and coil 2CA is connected by wire 502 to wire 498, with said wire 502 containing normally closed contacts of switch 2CLS-5 and normally open contacts of switch TLS-2 which are mechanically interlocked with the normally closed contacts of switch TLS8-1 located in wire 498. The wire 502 is connected to wire 488 by wire 503, which contains normally open contacts of the rear cross slide fast ahead selector switch which is actuated by the button 386 on the control panel. This wire 503 also contains normally closed contacts of switch 2CLS-6. The wire 501 intermediate coil 2CR and contacts of switch 2CLS1-2 is connected to wire 488 by wire 504 containing normally open contacts of the rear cross slide fast reverse selector switch and which contacts are mechanically interlocked with the normally closed contacts of said switch in wire 494. The wire 504 also contains normally closed contacts of switch 2CLS7.

The wire 503 intermediate the contacts of switch 2CLS-6 and the normally open contacts of the rear cross slide fast ahead selector switch is connected to wire 432 by wire 505. This wire 505 contains the normally open contacts of the rear cross slide feed selector switch and which contacts are mechanically interlocked with the closed contacts of said switch located in wire 500. The wire 505 also contains normally closed contacts 2CA-5 and 2CR-7 and the coil of relay 2CF. The wires 500 and 505 are interconnected by wire 506 containing normally open contacts AR-8 of the hand automatic selector switch that is actuated by the knob 393 on the control panel.

Referring to Fig. 32, it will be seen that wire 488 is connected to wire 496 by wire 507 containing the normally open contacts of the turret slide fast reverse selector switch that is actuated by the push button 390 on the control panel 40. The wires 431 and 432 are connected by wire 508 containing normally closed contacts of turret slide feed selector switch actuated by the button 388. The wire 508 also contains normally open contacts AR-9 of the hand automatic selector switch that is actuated by the knob 393. In addition normally closed contacts of switch PLS2-1 and ILS2-2 and TLS12-1 are in the wire 508. Also this wire 508 contains normally closed contacts IR-1 and normally open contacts UV-2 as well as coil TA of the turret ahead contactor.

The normally open cycle start switch controlled by push button 397 on the panel 40 is in parallel with the normally closed contacts in wire 508 of switches PLS2-1 and ILS2-2. The normally closed contacts of switch PLS3-1 and the normally open contacts of switch TLS3-2 are in series with each other in wire 509 and are in parallel with the normally closed contacts of switch PLS2-1 in wire 508.

The wires 488 and 432 are interconnected by wire 510 containing normally open contacts of the turret slide feed selector switch which is mechanically interlocked with the normally closed contacts of said switch in wire 508. Normally closed contacts TA-6, TR-7, normally open contacts UV-3 and the relay coil TF of the turret feed relay are located in wire 510. The wire 510 is connected to wire 508 by wire 511 containing normally open contacts AR-10 of the hand automatic selector switch, while wire 508 intermediate the contacts of switch TLS12-1 and normally closed contacts IR-1 is connected to wire 488 by wire 512 containing the normally open contacts of the turret slide fast ahead selector switch which is actuated by push button 389 of the control panel.

Wires 475 and 432 are connected by wire 513 containing normally open contacts of switch PLS1-1 and the pick-up coil ILR of the index latch relay and by wire 514 containing the normally open contacts of switch ILS2-1 and the release coil of the index latch relay ILR. The wires 475 and 432 are also interconnected by wire 515 containing normally open contacts of switch ILS4-1, normally open contacts of switch ILS1-1 and the relay coil IR. The wire 488 is connected to wire 515 by wire 516 containing normally open contacts of the turret index switch which is actuated by push button 396 on the control panel. The wire 431 is connected to wire 516 by wire 517 containing normally open contacts ILR-1. The wires 475 and 432 are connected by wire 518 containing normally open contacts of switch ILS1-2 and normally open contacts of UV-1 in parallel. The wire 518 also contains the under voltage relay coil UV. The wires 475 and 432 are also interconnected by wire 519 containing the normally open contacts of SP-5 and the normally open contact of the coolant switch which is actuated by the control knob 391 on the control panel.

In addition wire 519 contains the normally open contacts of switch VLS-1 located in the main control drum and also the solenoid HPSV of the high pressure solenoid valve. The wire 519 is connected to wire 432 by wire 520 containing the solenoid LPSV of the lower pressure solenoid valve.

In order to coordinate and clarify the detailed description hereinbefore set forth a resume will be given of the operations of the machine under hand control operation and automatic control operation.

Hand control operation

Assuming that both cross slides and the turret slide are in their retracted positions, that the ring 351 on the main control drum has inserts of the type 351a in all the index positions, that a work piece is loaded in the chuck of the work spindle and that the main disconnect switch DS has been closed, the operator manually closes the auxiliary motor switch located on the back of the headstock and in wire 455 of the control circuit, Fig. 30, to energize contactor coil AM and close contacts AM-1, AM-2 and AM-3 in the circuit to the auxiliary motor 406 to start the operation of said motor and the operation of the generator 407 and the pump 142. The operation of the generator 407 energizes the D. C. control circuit Fig. 29 and the operation of the pump 142 produces hydraulic pressure in the hydraulic circuit to the clutches in the spindle drive turret unit.

Assuming that the door 41 is closed so that switch KLS1-2 in wire 411 of the D. C. circuit is closed, then the energization of said D. C. circuit energizes the index brake coil IB in wire 454 and located on the turret index shaft 293, Fig. 15. The energization of the D. C. control circuit also energizes brake magnet TB of the planetary unit connecting shafts 276 and 281, Fig. 15, and in the drive to the turret slide. Also at this time magnet 1CB in wire 448 is energized, said magnet being located in the planetary unit connecting shafts 163 and 170 in the drive to the front cross slide, Fig. 8. Likewise magnet 2CB in wire 450 is now energized, said magnet being associated with the planetary unit connecting shafts 189 and 191 in the drive to the rear cross slide. In addition the solenoid coils SB2 in wire 437, SC2 in wire 436 of the solenoid operated valves are energized to actuate their respective valves and put hydraulic pressure in the lines 121, 122, see Figs. 5 and 6, to energize both clutches on shaft 95 to brake said shaft and the work spindle, see Fig. 3.

Assuming that the operator has turned control knob 393 of the hand automatic selector switch to hand position, see Fig. 23, then normally open contacts HR-1 in wire 474, HR-2 in wire 473, HR-3 in wire 459, HR-4 in wire 487 and HR-5 in wire 440 are closed, see Figs. 30, 31 and 29. The operator also turns control knob 394 of the spindle control switch to "off" position to close the normally open contacts of said switch in wire 457, see Fig. 30.

Assuming that it is desired to operate the spindle at No. 2 speed, the operator turns control knob 392 of the spindle speed selector switch to No. 2 position, see Fig. 23, to close normally open contacts HS-2 in wire 473, Fig. 30. The operator also turns control knob 395 to the proper position for the desired feed of the turret slide which will be assumed as the No. 2 position, see Fig. 23. This causes normally open contacts HF-2 in wire 442 to close, see Fig. 29. The closing of contacts HF-2 immediately causes coil FC2 in wire 441 to be energized since contacts HR-5 in wire 440 already have been closed, see Fig. 29. The energization of coil FC2 holds internal gear 267 on shaft 255 against rotation to effect a gear change in the planetary gear unit on said shaft and in the drive to the turret slide, see Fig. 15. The operator now momentarily depresses button 398 on the control panel to start the operation of the main motor 42. The contacts of the motor start switch in wire 457 are thus closed and since spindle "off" contacts of the spindle control switch in wire 457 had previously been closed contactor coil MM is energized and contacts MM-1, MM-2 and MM-3 of the main motor contactor are closed. The energization of coil MM also causes normally open contacts MM-4 in wire 456 to close to establish a holding circuit to the coil MM and in addition causes normally open contacts MM-5 in wire 431 to energize the line 431 of the control circuit, see Fig. 30.

In order to initiate rotation of the spindle the operator now turns the control knob 394 of the spindle control switch from "off" position to "run" position, see Fig. 23, whereupon the spindle run contacts of said switch in wire 459 are closed and the spindle "off" contacts thereof in wire 457 are open. The closure of the spindle run contacts in wire 459 causes coil SP in wire 458 to be energized, it being recalled that contacts HR-3 in wire 459 already are closed.

The energization of coil SP closes normally open contacts SP-1 in wire 435 and also opens normally closed contacts SP-2 and SP-3 in parallel with wires 436 and 437, see Fig. 29. This results in deenergization of magnet SC2 and hence only one of the clutches on shaft 95 is now engaged and therefore the braking action against said shaft and spindle is released. Since contacts HS-2 and HR-2 in wire 473 are already closed, coil SR2 in wire 470 is energized, thus closing normally open contacts SR2-1 in wire 436 and opening normally closed contacts SR2-2 in wire 437, whereupon coil SC2 is energized and coil SB2 is deenergized to actuate the respective valves to engage clutch element 97 with shaft 95 and disengage clutch element 94 from shaft 95, see Fig. 3. Since normally open contacts SP-1 in wire 435 are now closed coil SB1 in wire 434 is energized to actuate its respective valve and cause clutch element 55 to be clutched to shaft 51. In this manner the desired spindle speed is obtained and the spindle will now be rotating at the No. 2 speed.

Assuming that a forming cut by a tool carried by the front cross slide is to be made first on the work piece, the operator actuates button 383 on the control panel to close the normally open contacts of the front cross slide fast ahead switch in wire 491, see Fig. 31, whereupon contactor coil 1CA is energized opening normally closed contacts 1CA-5 in wire 489 and preventing energization of coil 1CF and at the same time opening normally closed contacts 1CA-4 in wire 448 and deenergizing magnet 1CB of the planetary unit in the drive to the front cross slide, thus releasing the braking action of the shaft 170. Also the energization of coil 1CA closes contacts 1CA-1, 1CA-2 and 1CA-3 in the circuit to the front cross slide motor 171 and said motor now operates to impart a fast ahead movement to the front cross slide. When the cross slide approaches the point where its feeding movement is to commence the operator releases button 383 and the circuit just described returns to normal and then the operator actuates button 382. The actuation of button 382 closes the normally open contacts of the front cross slide feed switch in wire 489 and energizes coil 1CF which causes contacts 1CF-2 in wire 448 to open, deenergizing magnet 1CB and releasing the brake on the shaft 170. Also at this time normally open contacts 1CF-1 in wire 447 are closed energizing magnet 1CC of the planetary unit connecting shafts 163 and 170, whereupon the front cross slide is driven from the spindle, see Fig. 8, and at a predetermined feeding rate. When the feeding movement of the front cross slide is completed the operator releases the button 382 thus deenergizing magnet 1CF and its circuit returns to normal and the drive to the front cross slide is interrupted. The operator in order to retract the front cross slide now actuates button 384 on the control panel to close the normally open contacts of the front cross slide fast reverse switch in wire 492, thus energizing coil 1CR. The energization of coil 1CR opens contacts 1CR-5 in wire 489 to prevent forward movement of the front cross slide and opens contacts 1CR-4 in wire 448 to deenergize magnet 1CB and release the brake on shaft 170. Also the energization of this coil closes contacts 1CR-1, 1CR-2 and 1CR-3 of the reverse contactor for the front cross slide motor 171, whereupon said motor operates at fast speed in the reverse direction to cause the cross slide to be retracted at the rapid speed. When the front cross slide reaches its retracted position the operator releases the button 384, deenergizing coil 1CR and the circuit returns to normal.

Referring to Fig. 31 it will be noted that limit switch 1CLS6 is in series with the front cross slide feed and fast ahead switches while limit switch 1CLS7 is in series with the front cross slide fast reverse switch. These switches are safety switches to prevent overtravel of the cross slide in either direction and are located in the switch box 202 and are actuated by the front cross slide drum 223 which it will be recalled rotates in timed relation to the movement of the drum, see Figs. 8, 9, 10 and 14.

The second step in the operation of the machine under manual control will be assumed as involving a machining operation on the work piece by a tool mounted on the No. 1 face of the turret. It will be further assumed that the indexed position of the turret is such that the No. 1 face thereof is in operative position and it has already been stated that the turret slide is in its rearward position. Therefore normally open switch ILS1–2 in wire 518 is closed by the action of the rod 353, see Fig. 22, which is in No. 2 position. The closing of the contacts of switch ILS1–2 energizes under-voltage coil UV in wire 518 which closes contacts UV–1 establishing a holding circuit to said coil and also closing contacts UV–2 in wire 508 of the turret ahead circuit and UV–3 in wire 510 of the turret feed circuit. Hence the operator by actuating button 389 on the control panel 40 can cause the turret slide to move forwardly at the rapid rate since the turret fast ahead switch in wire 512 closing energizes coil TA in wire 508, whereupon normally closed contact TA–6 in wire 510 opens thus preventing energization of the turret feed coil TF in said wire. Also the energization of coil TA opens normally closed contacts TA–4 in wire 452 of the D. C. circuit, thus deenergizing magnet TB to release the braking action on the shaft 281, Fig. 15. At the same time contacts TA–1, TA–2 and TA–3 in the circuit to the motor 283 are closed and said motor is energized for forward operation, wherefore the turret slide is driven through its drive train at a rapid forward speed.

When the turret slide reaches feeding position the operator releases the fast ahead button 389 and actuates the turret feed button 388 to close the normally open contacts of the turret feed switch in wire 513. The releasing of the fast ahead button 389 causes the circuit containing the fast ahead switch to return to normal. The closure of the contacts of the turret feed switch in wire 510 energizes the turret feed coil TF in said wire, opening contacts TF–2 in wire 452 to maintain braking magnet TB deenergized. Also contact TF–1 in wire 451 is closed energizing magnet TC of the planetary unit on the shafts 276, 281 and causing said unit to effect driving of the shaft 281.

The planetary units on the shafts 255 and 255a have already been conditioned by the setting of the control knob 395 of the turret feed selector switch and hence the turret slide is now driven from the spindle at the desired feeding rate. At the end of the machining operation the operator releases button 388 and actuates button 390 to effect fast return movement of the turret slide. The release of button 388 deenergizes the turret slide feed circuit and said circuit returns to normal while the actuation of button 390 closes the turret slide fast reverse switch in wire 507 thus energizing the turret slide reverse coil TR in wire 496 and opening contacts TR–7 in wire 510 to prevent energization of the turret slide feed coil TF.

The energization of coil TR also opens contacts TR–4 in wire 452 of the D. C. circuit to maintain brake magnet TB deenergized. In addition, contacts TR–1, TR–2 and TR–3 in the circuit to the motor 283 are closed and said motor is energized for reverse operation, wherefore the turret is moved rearwardly at the fast rate.

As the turret slide reaches its rearward position the operator releases the fast reverse button 390 and presses the turret index button 396 on the control panel 40 to close the normally open hand operated index switch in wire 516. When the turret is almost in its rearward position so that rod 353, Fig. 22, is in No. 2 position, then normally open switch ILS1–1 in wire 515 is closed and hence index coil IR in said wire can be energized. It will be understood, however, that when the turret slide reaches its rearward position the rod 315, Fig. 16, is moved by the dogs 316a to move the plungers 309 and 310 to cause the driving member 305 to be disconnected from the driven member 308 to interrupt the drive to the shaft 286 and to the screw 331. Therefore the turret slide movement and the main control drum movement toward the rear are terminated but the motor 283 continues to operate in the reverse direction since contact IR–2 in wire 499 is now closed and thus continues to drive the sleeve 292 of the turret index clutch. The energization of index coil IR opens contacts IR–1 in wire 508 preventing energization of turret ahead coil TA. Also energization of index coil IR opens contacts IR–4 in wire 454 of the D. C. circuit, thus deenergizing brake magnet IB of the turret index clutch. In addition, energization of coil IR closes contacts IR–3 in wire 453 to energize clutch magnet IC of the turret index clutch, whereupon the sleeve 292 drives the shaft 293 through the planetary gear unit and effects indexing of the turret 45. The indexing rotation of shaft 293 drives the indexing cams 319 through gears 301, 302, 313 and 338. The indexing rotation of cams 319 closes switch ILS4–1 in wire 515, whereupon the operator can release turret index button 396 and the indexing of the turret continues until it has been completed and said switch ILS4–1 under the control of the cams 319 opens to interrupt the circuit to index coil IR, whereupon said circuit returns to normal.

Assuming that the third step in the cycle utilizes the tool on turret face No. 2, the operator can manually control the fast forward movement, feeding movement, fast return movement of the turret slide and the indexing of the turret during the third operative step in the manner just explained for the second operative step.

Further assuming that the fourth operative step involves the use of a tool carried by the rear cross slide, the operator can manually control the fast ahead, feed and fast reverse movements of the rear cross slide by the buttons 386, 385 and 387 on the control panel in the same manner as described with respect to the corresponding control buttons for the front cross slide which were utilized during the first operative step of the cycle. In this connection it will be recalled that the relays and contacts in the control for the front cross slide are designated 1CA or 1CR or 1CF, while the corresponding elements for the rear cross slides are designated 2CA, 2CR or 2CF.

It will be understood from the foregoing description of the manual control of the machine that said machine can be operated by means of the control buttons on the panel 40 in any desired manner and that the operative cycle may include a various number of operative steps, it being deemed unnecessary to explain in detail any further use of the manual control elements on the panel 40.

*Automatic control*

The operation of the machine under automatic control will now be described. The operator either turns or sees that the hand automatic selector switch knob 393 is in the "automatic" position so that contacts AR-1 to AR-11 inclusive are closed. The positioning of knob 393 in the "automatic" position causes all of the hand controlled switches to be thrown out of the circuit except the spindle control switch actuated by knob 394. The operator therefore turns the knob 394 to "off" position to close the spindle contacts in wire 457, it being recalled that the other two contacts of said switch will now be open.

It will be assumed for purposes of illustration that the work piece to be machined during the automatic operative cycle is bar stock cut to length and which is shaped into a flanged tubular member having a bore and a counterbore. It will also be assumed that the first step of the operative cycle will comprise a rough turning of the outside of the stock by a turning tool carried on the No. 1 face of the turret and with the spindle rotating at speed No. 1 and the turret slide feeding at feed No. 1. The esecond operative step will include finished turning of the outer surface of the stock by means of a turning tool on the No. 2 face of the turret. The spindle speed will now be No. 3 and the turret feed rate No. 4. Also a suitable dwell for the tool at the end of the cut will be provided for the No. 2 step as will later be explained. In addition, the No. 2 step will include facing and necking the stock at the flange by means of a facing and necking tool carried on the rear cross slide.

The No. 3 step will be assumed to include boring and drilling the stock by means of a suitable drill and counterbore tool carried by the No. 3 face of the turret. For this operation the spindle speed will be No. 1 and the turret slide feed No. 2, there being a dwell provided at the end of the cutting stroke for the drilling and boring tool.

The No. 4 step consists of finishing the counterbore by means of a cutting tool carried on the No. 4 face of the turret, employing spindle speed No. 4 and turret slide feed No. 3 for this operation and providing for a suitable dwell at the end of the cutting stroke of the tool.

For the 5th operative step, the No. 5 face of the turret is provided with a cross sliding necking tool while the front cross slide is provided with a pusher to move the necking tool radially of the counterbore and also with a combination facing and chamfering tool for chamfering and facing the end of the work piece. For the 5th step the spindle rotates at No. 2 speed. In view of the character of the work piece and the machining operations to be performed thereon during the automatic operation of the machine the operator further sets up the machine as follows:

With respect to the No. 1 side of the main control drum which corresponds to the No. 1 face of the turret, the operator positions the continous type dogs 347 in the slot on the said side of the drum for operating limit switch TLS12-1, the overrunning dog 348 for operating limit switch TLSF-1 and the overrunning dog 348 for operating limit switch TLS0. He also adjusts dog 316a in its slot on the No. 1 side of the drum in proper position for the desired stroke of the turret slide during the No. 1 step.

In connection with the No. 2 step of the operation, the operator positions dogs 347 and 348 as required in the slots on the No. 2 side of the control drum and corresponding to the No. 2 face of the turret. The dog 347 which actuates limit switch TLS12-1 is of the continuous type, while the dogs 348 which actuate limit switches TLSF-4, TLS10-1, TLS0 and TLS1 are of the overrunning type. The operator also adjusts dog 316a of the No. 2 side of the drum to regulate the stroke of the turret slide for the second operative step.

In setting the machine up for the third operative step the dogs 347 in the slots on the third side of the control drum are of continuous type and are positioned to actuate limit switches TLS12-1 and VLS-1 while the overrunning dogs 348 are positioned to actuate limit switches TLSF-2 and TLS0 at the desired times. The operator further adjusts the dog 316a on the third side of the drum to control the stroke of the turret slide for the third operative step.

In connection with the forth operative step, the continuous type dog 347 and the overrunning type dogs in the slots on the fourth side of the control drum are properly adjusted to actuate the limit switches TLS12-1, TLSF-3, TLS0, TLS1 and TLS2. In addition the dog 316a carried by the fourth side of the control drum is adjusted to regulate the stroke of the turret slide for the fourth operative step.

For the fifth operative step the overrunning dogs 348 in the slots in the No. 5 side of the control drum and which actuate limit switches TLS0 and TLS2 are adjusted. As in the other steps, the dog 316a carried by the No. 5 side of the control drum is adjusted.

The cams on the index plate 342 are arranged as follows: Cam 356 for step 1; cam 356a for steps 2, 3 and 4 and cam 356b for step 5. In this setup of the machine it is not necessary to employ cam 356c, it being understood that in other setups said cam might be employed. The cams carried by the ring 351 are set up as follows: Cam 351b for step No. 1; cams 351c for steps 2 to 5 inclusive, it being understood that in the present setup it is not necessary to use cam 351a.

The operator will also adjust the knobs 236 to 239 inclusive of the control drum 219 for the front and rear cross slides to provide the total length of stroke, feed stroke, and dwell for said cross slides, it being recalled that the rear cross slide functions only in the No. 2 step with early feed and the front cross slide only in the No. 5 step with late feed in the particular setup being described.

When this has been done and the operator has closed the door 41 of the compartment housing the cross slide control drum 219, the contacts of switches KLS1-1 and KLS1-2 are closed thus completing the control circuits and the D. C. circuit, respectively, for subsequent energization. The operator now puts the spindle gear shifter lever 130 in the desired position (see Fig. 4) and the cross slide gear shifter levers 165 and 186 in the desired positions, see Fig. 1. He can now close the main disconnect switch DS, energizing the power circuit and the control circuits. When he has done this he closes the auxiliary motor switch in wire 455, energizing auxiliary motor contactor AM and closing contacts AM-1, AM-2 and AM-3 in the power circuit, see Fig. 28, thus energizing auxiliary motor 406 and driving the D. C. generator 407 and pump 142 in the hydraulic circuit of the spindle transmission. Since the D. C. circuit is now energized solenoid valve SC2 in wire 436 and solenoid valve SB2 in wire 437 are energized and act to apply the brake to the spindle as explained in connection with hand operation.

After turning the spindle control switch to off position the operator pushes the motor start button 398 of the control panel 40 to effect energization of the main motor contactor MM to close contact MM-4 in wire 456 and contact MM-5 in wire 431. This also closes contacts MM-1, MM-2 and MM-3 in the power circuit and energizes the main motor 42, it being recalled that the closing of contact MM-4 forms a holding circuit around the start push button switch 398.

It will be recalled that when No. 1 face of the turret is in operative position the rod 353 being in contact with cam 351b is held in No. 3 position and thus limit switch ILS1-2 in wire 518 is closed, thus energizing the under voltage relay UV (see Fig. 32) and closing contact UV-1 in the holding circuit around said limit switch. The energization of relay UV also closes contact UV-2 in wire 508 and contact UV-3 in wire 510.

The operator now turns the spindle control switch knob 394 to the "run" position, whereupon its "off" contact in wire 457 is opened and its "run" contact in wire 459 closed. The machine has now been set up and is ready for the commencement of the complete automatic work cycle when bar stock is mounted in the chuck. Assuming that the operator has now mounted such stock in the chuck he then closes the cycle start switch in wire 508, the button 397 of which switch is on the panel 40. The closing of the cycle start switch energizes the turret ahead contactor TA, whereupon interlocked contacts TA-6 in wire 510 and TA-4 in wire 452 are opened and the turret brake coil TB is deenergized and the brake on shaft 281 is released. The contacts TA-1, TA-2 and TA-3 in the power circuit are closed energizing the turret rapid traverse motor 283, Fig. 28, and moving the turret slide and the control drum forward at a fast rate. During the forward rapid traverse movement the dogs on the control drum operate limit switches TLSF-1 and TLS0 to close the former and energize turret feed relay FR1 to close contact FR1-2 in wire 477 to seal said relay into the circuit. This causes interlocked contacts FR1-3 in wire 479, FR1-4 in wire 481 and FR1-5 in wire 483 to open while contact FR1-1 in wire 433 closes and effects energization of clutch coil FC1 on sleeve 260 (Fig. 15) to set the turret feed gearing for feed No. 1. Closing the latter energizes relay SR0 in wire 467 momentarily and opens contacts SR0-3 in wire 471 and contacts SR0-4 in wire 472 to insure deenergization of relays SR1 and SR2 to effect the selection of spindle speed No. 1.

At the end of the forward rapid traverse movement of the control drum, the continuous dog 347 on the control drum opens limit switch TLS12-1 which deenergizes the turret ahead contactor coil TA in wire 508 and its circuit returns to normal. Also the opening of limit switch TLS12-1 causes contact TA-6 in wire 510 to close, wherefore current flows from wire 431 through the now closed contact AR-9, the normally closed limit switch PLS2-1, the normally closed limit switch ILS2-2, the now closed contacts AR-10, the normally closed contacts TA-6 and TR-7 and the now closed contact UV-3 energizing turret feed relay TF. The energization of the relay TF opens contacts TF-2 in wire 452, thus maintaining the brake TB on shaft 281 released. At this time the contact TF-1 in wire 451 is closed energizing turret clutch coil TC and holding the gear 277 to cause a drive to the shaft 281 through the turret planetary unit. At this time contact TF-3 in wire 463, Fig. 30, is closed and current flows from wire 431 through the spindle run contact in wire 459, through the now closed contact AR-1 in wire 461, through wire 460 to wire 458, thereby energizing the spindle relay SP. When said relay is energized contacts SP-2 and SP-3 in wires 436 and 437, respectively, Fig. 29, are opened, releasing the brake on the spindle transmission. Concurrently contact SP-1 in wire 435 is closed and solenoid valve SB1 is energized while solenoid valve SB2 remains energized, due to the normally closed contact SR2-2. The solenoid valves SB1 and SB2 being energized the hydraulic clutches 62 and 105 are engaged to drive the spindle at speed No. 1 and the turret at feed No. 1 for the first operation.

When the end of the turret feed is reached the dog 316a (see Fig. 16a) strikes the left hand arm 316 on the slidable rod 315 to move said rod and rock the lever 314 and withdraw the plunger 310 and push the plunger 309 deeper into the groove in the driven member 308 to shift said member axially into the position shown in Fig. 16a to shift the fork 362 and rod 363 to actuate switches PLS1-1, PLS2-1 and PLS2-2, while normally closed switch PLS3-1 and normally open switch PLS3-2 are not yet actuated.

The closing of normally open limit switch PLS1-1 in wire 513, Fig. 32, energizes the index latch relay pick-up coil ILR (P) to close contact ILR-1 in wire 517 to condition the index circuit. When the contacts of limit switch PLS2-1 are opened relay TF in wire 510 is deenergized and its circuit returns to normal and the spindle stops rotating since contacts TF3 in wire 463 open, thereby deenergizing relay SP in wire 458. The closing of the contacts of limit switch PLS2-2 in wire 497 energizes the turret reverse contactor TR in wire 496, thereupon opening interlock contact TR-7 in wire 510 thus preventing accidental energization of relay TF. At this time the contact TR-4 in wire 452, Fig. 29, is closed to maintain the brake on shaft 281 released, while contacts TR-1, TR-2 and TR-3 are now closed to energize rapid traverse motor 283 in a reverse direction (Fig. 28) and return the turret and turret drum at a fast rate of movement, it being understood that the clutch in the drive to the turret becomes engaged as soon as the driving member 305 thereof rotates in the reverse direction.

When the turret reaches the end of its rearward fast travel the stationary and right hand dog 316a (Fig. 16b) moves the right hand arm 316 and shifts the rod 315 toward the right to cause the driving member 305 and the driven member 308 of the clutch to be operatively disengaged as indicated in Fig. 16b, and thus to terminate the drive to the turret slide and to again actuate limit switches PLS2-1 and PLS2-2 and subsequently switches PLS3-1 and PLS3-2.

It will be understood that during the reverse travel of the control drum the limit switch TLS12-1 in wire 508 was closed. The return of the control drum to its rear position caused the rod 353, due to the engagement of the cam 351b therewith, to move into its No. 3 position and actuate limit switches ILS1-1, ILS1-2 and ILS2-2 in wires 515, 518 and 508, respectively. The closing of switch ILS1-2 picks up the under voltage relay in case the voltage has dropped during the return stroke, while the closing of switch ILS1-1 energizes the index relay IR since contact ILR-1 in wire 517 closed at the end of the feed stroke. The switches PLS3-1 and PLS2-1 in wires 509 and 508 and which have remained open during the return stroke are now closed at the end of said stroke but this has no effect on the stroke, since limit switch ILS2-2 and contact IR-1 are now open. Limit switches PLS2-2 and PLS3-2 in wires 497 and 495 which remain closed during the return movement of the slide to maintain the turret reverse contact TR energized were opened at the end of such return movement but this produces no effect on the turret reverse contactor since the closing of contact IR-2 in wire 499 maintains it energized. The turret rapid traverse motor 283 is now used to index the turret, since the energization of the index relay IR also opened contact IR-4 in wire 454 releasing the index brake IB, deenergizing brake coil IB, while the closing of contact IR-3 in wire 453 energized the clutch coil IC of the turret indexing transmission. The turret and the control drum now start to index, whereupon the index cam 319 closes limit switch ILS4-1 in wire 515 and as the drum indexes the roller 352 on rod 353 rides off the cam 351b to position 2. Then as the turret approaches the index position No. 2 with cam 351c, the roller 352 on rod 353 rides up on the high point of the cam 351c to shift the said rod to the No. 4 position. This causes limit switch ILS2-1 in wire 514 to momentarily close and energize the release coil of the indexing latch relay ILR (R) and open contact ILR-1 in wire 517. The opening of contact ILR-1 has no effect on the index circuit since limit switch ILS4-1 in wire 515 is closed. The turret continues to index to No. 2 position and the cam 319 releases the plunger of the limit switch ILS4-1 to deenergize the index relay IR and its circuit and the circuit to the turret reverse contactor returns to normal. As the control drum indexes to the No. 2 position the roller 352 is on the low portion of the cam 351C and thus the rod 353 is in the No. 2 position and limit switch ILS2-2 in wire 508 closes. When the index relay IR was deenergized the contact IR-1 in wire 508 returned to its normally closed position and the turret ahead contactor TA was energized, whereupon the turret starts ahead at a rapid rate for the second operation.

The operation of the electrical circuit for the turret and spindle for the second operative step for face No. 2 is very similar to the operation thereof for the first operative step, with the exception that the turret feeds at feed No. 4 and the spindle rotates at speed No. 3. In addition, the turret dwells and a facing and necking cut is taken on the stock by the tool carried by the rear cross slide. During the forward rapid traverse movement, the overriding dog 348 on the control drum operates limit switch TLSF-4 to operate relay FR4 to obtain turret feed No. 4 similar to the way in which TLSF1 operated relay FR1 on face No. 1 to obtain turret feet No. 1. Also during the forward rapid traverse movement, the overriding dogs 348 on the small portion 335 of the control drum closes limit switch TLS1 and the limit switch TLS0. When the latter is closed the relay SR0 in wire 467 is energized to open contacts SR0-3 in wire 471, contacts SR0-4 in wire 412 and to close contacts SR0-1 in wire 469 and contacts SR0-2 in wire 470. Since limit switch TLS1 is closed, relay SR1 is now energized and since limit switch TLS2 is open SR2 remains deenergized. Energizing relay SR1 closes contacts SR1-3 in wire 472, contacts SR1-1 in wire 433 and opens contacts SR1-2 in wire 434. Upon further movement of the control drum, limit switch TLS0 returns to normal first, deenergizing relay SR0 and closing contacts SR0-4 in wire 472 thus maintaining relay SR1 energized. Further movement of the control drum releases limit switch TLS1 to normal. Thus we have conditioned relays SR1 and SR2 to select solenoids SC1 and SC2 for spindle speed No. 3 when relay SP is operated similar to its operation for face No. 1. Also during the forward rapid traverse movement of the control drum the limit switch TLS10-1 in wire 500 is momentarily closed by an overrunning dog 347 on the face of the control drum. The closing of this switch energizes the rear cross slide rapid traverse contactor 2CA, opening interlock contact 2CA-5 in wire 505 and contact 2CA-4 in wire 450 to release the brake on shaft 191. At the same time contacts 2CA-1, 2CA-2 and 2CA-3 in the power circuit are closed, effecting energization of the rear cross slide motor 192. As soon as the motor starts the forward motion of the rear cross slide, the drum 219 commences to rotate. The ring 228 carried by the rotating drum actuates the normally open limit switch 2CLS3-1 in wire 500 to close the same and maintain the circuit to the cross slide rapid traverse contactor 2CA. The turret slide and the rear cross slide both are moving at the rapid rate in the forward direction and when the rear cross slide reaches the end of this rapid movement the ring 227 opens limit switch 2CLS4-1 in wire 500 and deenergizes the contactor 2CA to cause its circuit to return to normal, whereupon contact 2CA-5 in wire 505 returns to its normally closed position and energization of the rear cross slide feed relay 2CF is effected. Upon the energization of this relay contact 2CF-2 in wire 450, Fig. 29, opens to deenergize brake coil 2CB to release the brake on shaft 191. Also at this time contact 2CF-1 in wire 449 closes to energize clutch coil 2CC. This causes the rear cross slide to be driven from the spindle at the desired feeding rate. When the end of the feeding movement of the rear cross slide is reached the ring 229 opens the contacts of limit switch 2CLS1-1 in wire 500, Fig. 31, and the feed relay 2CF connected to wire 500 by wire 506 containing contacts AR-8 is deenergized. The ring 229 closes limit switch 2CLS1-2 in wire 501 and the reverse contactor 2CR is energized, whereupon contact 2CR-4 in wire 450, Fig. 29, is opened to maintain the brake 2CB on shaft 191 released and contacts 2CR-1, 2CR-2 and 2CR-3 in the power circuit are closed, thus energizing the rear cross slide motor 192 in a reverse direction to return the rear cross slide at a rapid rate. When the rear cross slide reaches the maximum out position the limit switch 2CLS1-2 in wire 501 is opened and the circuit of the reverse contactor 2CR returns to normal. At this time the contact of limit switch 1CLS1-1 in wire 500 returns to its normally closed position. To obtain the dwell required on face No. 2, cam 356a was used on ring 342 to operate limit switches TLS9-1 and TLS9-2 in wires 497 and 509, respectively. Closing limit switches TLS9-2 in wire 509 maintains energization of relay TF after limit switch PLS2-1 has been opened. Switch TLS9-1 prevents energization of relay TR even though limit switch ULS2–2 has been closed. Hence the feed relay TF remains energized after the movement of the turret has been stopped due to operative disengagement of the driven member 308 from the driving member 305 of the clutch operated by dog 316a at the end of the turret feed stroke. As the plate 367 of the dwell mechanism is rocked past the position of operation of limit switches PLS1–1, PLS2–1 and PLS2–2 it operates limit switches PLS3–1 and PLS3–2. Switches PLS3–1 and PLS3–2 then operate to perform exactly the same function as described for limit switches PLS2–1 and PLS2–2 for the operation on turret face No. 1. When the turret reaches its rearmost position the turret and control drum are indexed to their No. 3 position for the third operative step, as explained in connection with the indexing of the turret and control drum from No. 1 to No. 2 position in conditioning the machine for the second operative step.

The machine will operate in the third operative step similarly to its operation during the second operative step, with the exception that the electrical circuits are controlled during the third step to impart to the turret slide feeding movement at the No. 2 rate of feed and at No. 1 spindle speed.

Also the operation of the machine for the fourth operative step is similar to its operation for the second operative step, except that the spindle rotates at speed No. 4 and the turret moves at feed No. 3.

When the turret slide reaches its rearmost position at the end of the fourth operative step and as the turret is being indexed to its No. 5 position for the fifth operative step, the arm 357 will ride up on the high point of cam 356b to shift the rod 358 to No. 5 position and close limit switch TLS7–1 in wire 493 to energize the cross slide latch relay CLR (P), see Figs. 21, 21c and 31. The energization of the relay CLR (P) causes contacts CLR–2 in wire 485, CLR–1 in wire 495 and CLR–3 in wire 500 to open for a purpose which will later be pointed out. As soon as the indexing of the turret is completed the arm 357 and rod 358 are in the No. 3 position, thus closing the normally open limit switch TLS9–2 in wire 509 and opening the normally closed limit switches TLS9–1 in wire 497 and TLS11–1 in wire 495 to set up the dwell circuit and the circuit controlling the turret slide and the cross slide to provide the proper operation of the cross slide tool carried by the No. 5 face of the turret. Also when the turret has been indexed to its No. 5 face contact IR–1 in wire 508 is closed and since limit switch ILS2–2 in wire 508 is now closed the turret ahead contactor TA is energized, which starts the turret rapid traverse movement as for faces No. 1 and No. 2. During the rapid traverse movement the overriding dogs set up the spindle solenoids for spindle speed No. 2 in the same manner as described for face No. 2. When the turret slide reaches the end of its forward travel limit switches PLS2–2 in wire 497, PLS3–2 in wire 495, PLS2–1 in wire 508, PLS3–1 in wire 509 and PLS1–1 in wire 513 are actuated by the dwell mechanism. The closing of limit switch PLS1–1 energizes the index latch relay ILR (P) and sets up the index circuit by closing contact ILR–1 in wire 517 while the opening of contacts of limit switches PLS2–1 in wire 508, PLS3–1 in wire 509 deenergizes the turret ahead contactor TA and its circuit returns to normal, cutting out the drive to the turret slide and said slide remains in its most forward position. The closing of limit switches PLS2–2 in wire 497 and PLS3–2 in wire 495 would automatically cause the turret slide to return at rapid traverse but in the instant setup of the machine for the fifth step the contact CLR–1 and limit switch TLS11–1 in line 495 are open and therefore the closing of said switches PLS2–2 and PLS3–2 has no effect on the circuit. Since the turret brake coil TB in wire 452 is normally energized the turret slide is held fixed in its most forward position. In this instance limit switch PLS3–2 energizes relay 1CA through the now closed limit switch 1CLS5–1, limit switch TLS8–1 and contacts CLR–4. Energizing relay 1CA starts the front cross slide fast ahead motion in a manner similar to that explained for the rear cross slide operation in step No. 2, however, the late feed ring 230 has been adjusted to operate limit switch 1CLS5–1 at the end of the forward rapid traverse motion. Opening limit switch 1CLS5–1 in wire 498 deenergizes relay 1CA closing contacts 1CA–5 in wire 489 thus energizing relay 1CF. This starts the front cross slide moving inwardly in feed in a manner similar to that explained for the rear cross slide in connection with operative step No. 2 and the feeding movement of the front cross slide causes the chamfering and facing tool carried thereby to chamfer and face the work piece. As already pointed out, the front cross slide in addition to the combined tool mentioned is provided with a pusher that acts during the forward movement of the cross slide to push the cross slide tool carried by the turret to cut the neck in the bore of the work piece. When the chamfering and facing tool carried by the front cross slide and the sliding tool carried by the turret have completed their cuts the cross slide feed relay 1CF is deenergized since limit switch 1CLS1–1 in wire 485 is actuated by the control drum for the front cross slide to open position, while limit switch 1CLS1–2 in wire 486 is closed to energize cross slide return contactor 1CR. This causes contacts 1CR–7 in wire 495 to open to prevent energization of the turret return contactor coil TR in wire 496. At the same time contact 1CR–6 in wire 494 closes, energizing the relay coil of the cross slide latch relay CLR (R) to return to their normally closed positions contacts CLR–2 in wire 485, contact CLR–4 in wire 498, contact CLR–1 in wire 495 and contact CLR–3 in wire 500. The energization of contactor 1CR also opens contact 1CR–4 in wire 448 to release the brake 1CB on the shaft 179 while contacts 1CR–1, 1CR–2 and 1CR–3 in the power circuit close to energize the front cross slide motor 171 to return the front cross slide at a rapid rate. The turret slide remains in its foremost position during the return movement of the front cross slide. When the front cross slide reaches the end of its return movement limit switch 1CLS1–2 in wire 486 opens and contactor coil 1CR is deenergized and its circuit returns to normal. At this time contact 1CR–7 in wire 495 is in its normally closed position and since limit switch PLS3–2 in said wire was closed at the end of the forward movement of the turret slide and maintained closed the turret reverse contact coil TR in wire 496 is now energized. Hence contacts TR–1, TR–2 and TR–3 in the power circuit are closed and contact TR–4 in wire 452 is opened. Therefore the turret brake TB is released and the turret motor 283 energized to return the turret slide rearwardly at a fast rate. When the turret slide reaches the end of its rearward travel the drive to the turret slide is cut out and the turret indexes as explained in connection with the first operative step. As the turret indexes from face No. 5 to face No. 1 the cam 351b mounted on the indexed plate 351 in a position corresponding to face No. 1 of the turret moves the rod 353 into position No. 4 to cause the limit switch ILS2-1 to release the index latch relay ILR (R) and then when limit switch ILS4-1 opens to stop the index rod 353 in position 3 which causes the limit switch ILS2-2 in wire 508 to remain open and the turret ahead contactor coil TA to remain deenergized, it being recalled that the index plate 351 was provided with different types of cams for the other operative steps of the cycle and which caused the contactor coil TA to be energized each time the turret indexed. Therefore after the indexing of the turret at the end of the fifth operative step the turret remains in its most rearward position and the work spindle is idle and hence the complete work cycle is finished enabling the operator to remove the finished work piece from the chuck and to mount a new work piece therein, whereupon he again initiates the work cycle by depressing the button 397 of the cycle start switch as previously explained.

It will be appreciated that the work cycle may call for a different number of operative steps than the five steps referred to as, for instance, it may only include four or a less number of steps. In such event it may be necessary to skip index a turret face and to do this the operator in setting up the machine will put a cam 351a on the index plate 351 in position corresponding to the turret face which he wishes to skip index. Since the cam 351a has no high point on it the rod 353 will not move to position No. 4 but will remain in position No. 2 during the indexing and hence limit switch ILS2-1 in wire 514 will not be closed to energize the index latch release coil ILR (R) while contact ILR-1 in wire 517 will remain closed. Then when the indexing of one face is completed and limit switch ILS4-1 in wire 515 is opened the circuit to the index relay IR is maintained by contact ILR-1 in wire 517 and the turret will index through one face and to the next face or more, depending upon which type of cam is in the next position on the index wheel 351.

When the machine is operating in the automatic cycle of operation the spindle rotates only when the turret slide or one of the cross slides is moving in feed. If it is necessary to have the spindle rotate continuously during the entire forward and reverse movements of the turret slide the operator turns the selector switch knob 393 on the panel 40 to the semi-automatic position, thereby closing the switch SAR-1 in wire 462. Hence in this position of the control knob the contacts of said switch SAR-1 are closed, in addition to the contacts AR-1 to AR-11 inclusive in wires 461, 467, 471, 484, 490, 495, 500, 506, 508, 511 and 431, respectively, and which are normally closed in the automatic position. Therefore whenever turret ahead relay TA and contactor coil TR are energized and contacts TA-5 in wire 466 and TR-5 in wire 462 are closed spindle relay SP in wire 458 is energized causing the spindle to rotate during both the forward and return strokes of the turret slide.

Although the indexing drive to the turret 45 is shown for simplicity as including simply bevel gearing, it will be understood that said drive could include means for positively locating the turret in indexed position as, for example, the drive to the bevel gearing could include cams like the cams 319 and a disk driven thereby like the disk 340, such as are used in the indexing drive to the main control drum. Also the indexing drive to the turret could include a turret locating and locking mechanism such as shown in my application Serial No. 542,290, filed June 27, 1944, now Patent No. 2,453,120, granted November 9, 1948.

From the foregoing detailed description of the construction and its mode of operation it will be seen that the objects enumerated at the beginning hereof are adequately attained by the machine which can be set up for a wide variety of different machining operations in accordance with the work piece to be produced, while the machine can be operated either manually, semi-automatically or automatically as desired.

Although a preferred embodiment of the invention has been illustrated and described herein it will be understood that the invention is susceptible of various modifications and adaptations within the scope of the appended claims.

Having thus described my invention, I claim:

1. In a machine tool having a headstock mounting a spindle; front and rear cross slides, a turret slide, means for driving said spindle independent drive train units for said front cross slide, rear cross slide and turret slide, a common drive member for said units driven in timed relation with said spindle, each unit including means for driving its respective slide for fast idle movements, separate control means for each unit to effect feeding movement and fast idle movements of the respective slide and to stop the same at the end of its rearward movement, said control means being actuated in timed relation to the movement of its respective slide.

2. A machine tool as defined in claim 1 and wherein said control means for the cross slides are rotatable and said control means for the turret slide is longitudinally movable.

3. A machine tool as defined in claim 1 and wherein the control means for the turret slide drive train unit includes elements for controlling the movements of the turret slide for a plurality of operative steps of the work cycle of the machine and also includes instrumentalities for initiating in certain of said operative steps and at a predetermined point in the forward movement of the turret slide the movement of either cross slide and its control means.

4. In a machine tool having a headstock mounting a spindle; front and rear cross slides, a turret slide provided with an indexible turret, means for driving said spindle, independent drive train units for said front cross slide, rear cross slide and turret slide, a common drive member for said units driven in timed relation with said spindle, each unit including means for driving its respective slide for fast idle movements, a drive train unit for indexing said turret and operatively associated with the drive train unit for said turret slide, control means for each slide drive train unit to effect feeding movement and fast idle movement of the respective slide and to stop the same at the end of its rearward movement, said control means being actuated in timed relation to the movement of its respective slide, the control means for the drive train unit for the turret slide being provided with elements controlling the turret indexing drive train unit.

5. A machine tool as defined in claim 4 and wherein means is provided for moving the control means for the turret slide drive train unit longitudinally in timed relation to the movement of the turret slide and for indexing said control means in timed relation to the indexing of the turret.

6. A machine tool as defined in claim 5 and wherein brake means is provided for stopping the indexing movement of the turret and of the control means and for holding the same in indexed position, said control means for the drive train unit for the turret slide effecting release of said brake means while additional control elements operating in timed relation to the indexing of said turret and said control means effects actuation of said brake means.

7. In a machine tool having a turret slide provided with an indexible turret, means for moving said turret slide in feed and fast idle movements, means for indexing said turret, a control drum for said turret slide, means operatively connecting said control drum with said turret slide to move said drum axially in timed relation with the movements of the slide, an indexible member, means for indexing said member in timed relation to the indexing of said turret, said control drum and said indexible member having cooperating portions which interengage when said control drum is in its most rearward position, wherefore indexing of said member indexes said control drum, and stationary means operatively associated with said control drum and functioning when said drum is not in its most rearward position to prevent rotation of said drum during its axial movement.

8. A machine tool as defined in claim 7 and wherein a group of control elements is provided with means for actuating the same and which means is operated by the axial movement of the control drum as it approaches its rearward position, said control elements initiating the indexing of the turret.

9. A machine tool as defined in claim 7 and wherein there is a cross slide together with means controlling the movements of said cross slide in combination with a group of control elements which condition said means and an actuating member for said elements which is operated by the indexing movement of said indexible member.

10. In a machine tool having a turret slide provided with an indexible turret, means for moving said turret slide in feed and fast idle movements, means for indexing said turret, a control drum for said turret slide, means operatively connecting said control drum with said turret slide to move said drum axially in timed relation with the movements of the slide, an indexible member, means for indexing said member in timed relation to the indexing of said turret, said control drum and said indexible member having cooperating portions which interengage when said control drum is in its most rearward position, wherefore indexing of said member indexes said control drum, a group of control elements for initiating the indexing of the turret; means for actuating said elements in a predetermined manner and including an actuating member associated with said elements and interchangeable cam members mounted on the end of said control drum and cooperating with said actuating member as said drum approaches its rearward position.

11. In a machine tool having a turret slide provided with an indexible turret, means for indexing said turret, a cross slide, control means for said cross slide and driven in timed relation to the movements thereof, an indexible member driven in timed relation to the indexing of said turret, a group of control elements operatively associated with said indexible member and acting in cooperation with said control means to control the movements of the cross slide; means for actuating said control elements and including an actuating member operatively associated with said elements and interchangeable cam means on said indexible member and cooperating with said actuating member during the indexing of the indexible member.

12. In a machine tool having a turret slide provided with an indexible turret, means for moving said turret slide in feed and fast idle movements, means for indexing said turret, a control drum for said turret slide, means operatively connecting said control drum with said turret slide to move said drum axially in timed relation with the movements of the slide, an indexible member, means for indexing said member in timed relation to the indexing of said turret, said control drum and said indexible member having cooperating portions which interengage with said control drum in its most rearward position, wherefore indexing of said member indexes said control drum, a cross slide, means movable in timed relation with said cross slide for controlling the latter, a group of control elements for initiating the indexing of said turret; means for actuating said control elements and including an actuating member operatively associated with said elements and interchangeable cams mounted on the end of said control drum and cooperating with said actuating member as said drum approaches its rearward position; a group of control devices operatively associated with said indexible member and functioning in cooperation with the control means for said cross slide; and means for actuating said control devices and including an actuating member operatively associated with said devices and interchangeable cams mounted on said indexible member and cooperating with said last named actuating member during indexing movement of said indexible member.

13. In a machine tool having a cross slide, means for actuating said cross slide in forward and reverse movements, a member driven by said means in timed relation to the movement of said cross slide, a drum operatively associated with said member, means operatively connecting said member and said drum to drive the latter at a reduced speed with respect to said member, said drum being provided on its circumference with a plurality of adjustable cam rings, individual means carried by said drum for adjusting said cam rings, and control elements operatively associated with said drum for controlling the movements of said cross slide and actuated by said cam rings.

14. A machine tool as defined in claim 13 and wherein said member is housed within said drum and the operative connection between said member and said drum includes planetary reduction gearing carried in part by said member and in part by said drum.

15. In a machine tool having a headstock mounting a spindle; front and rear cross slides and a turret slide; means for driving said spindle, independent drive train units for said front cross slide, rear cross slide and turret slide, a common drive member for said units and located in said headstock and driven in timed relation with said spindle, each unit including independent change speed means located in the headstock, the drive train unit for the turret slide including a plurality of clutch devices arranged in parallel with each device driven through independent gear trains, said devices operating a common driven member.

16. In a machine tool having a spindle; front and rear cross slides and a turret slide; means for driving said spindle, independent drive train units for said front cross slide, rear cross slide and turret slide, a common driving member for said units and operated in timed relation with said spindle; each of said drive train units including change speed means, planetary gearing for effecting a feed drive through the respective train unit, and means for driving its respective slide at fast speeds in opposite directions; and interlocked control means for said planetary gearing and said rapid speed means in each unit being provided to effect selective alternate operation of said gearing or said rapid speed means to cause either feeding movement or rapid movement of the respective slide.

17. In a machine tool having a spindle; front and rear cross slides and a turret slide; means for driving said spindle, independent drive train units for said front cross slide, rear cross slide and turret slide, a common driving member for said units and operated in timed relation with said spindle, each of said drive train units including change speed means, planetary gearing for effecting a feed drive through the respective train unit, and means for driving its respective slide at fast speeds in opposite directions, and means for braking the movement of the drive train beyond said planetary gearing and holding the same against movement when the planetary gearing and the rapid speed means are both inactive with respect to imparting a feeding drive or a rapid speed drive to the respective slide.

18. In a machine tool having a spindle; front and rear cross slides and a turret slide; means for driving said spindle, independent drive train units for said front cross slide, rear cross slide and turret slide, a common driving member for said units and operated in timed relation with said spindle, each of said drive train units including change speed means, planetary gearing for effecting a feed drive through the respective unit, and means for driving its respective slide at fast speeds in opposite directions; the fast speed means of each unit being a reversible electric motor located intermediate the planetary gearing and the respective slide.

19. A machine tool having a spindle and a turret slide provided with an indexible turret, means for driving said spindle, a drive train unit for said turret slide and driven in timed relation to said spindle and including change speed means, a rapid traverse motor intermediate said change speed means and said slide and means for operatively connecting and disconnecting said unit and said slide; a drive train unit for indexing said turret, means operatively connecting said last named drive train unit with said first named drive train unit intermediate said motor and said connecting and disconnecting means; said drive train unit for said turret including reduction gearing for effecting an indexing movement of the turret by said rapid traversing motor when said first drive train unit is disconnected from said slide, and brake means for stopping the indexing movement of the turret and for holding the same in indexed position.

20. A machine tool as defined in claim 19 and wherein the reduction gearing is planetary gearing which with said brake means of the turret indexing drive train unit are controlled by means driven in timed relation to the indexing movement of the turret.

21. A machine tool having a spindle and a turret slide, means for driving said spindle, a drive train unit for said turret slide and driven in timed relation to said spindle and including planetary gearing for imparting a feed drive to said turret slide and reversible means for imparting a rapid idle movement to said turret slide, and an operative connection between said unit and said turret slide and including a driven shaft for moving said slide, a driving member operatively connected with said unit and an axially shiftable driven member operatively connected with said driven shaft, said members having cooperating means acting automatically upon rotation of the driving member in opposite directions to shift the driven member to establish a driving connection between said members; stop means operatively controlled in correlation to the movement of the slide and acting on said driven member when said slide reaches a predetermined position in its movement in one direction to shift the driven member in a direction to interrupt the driving connection between the members and to stop said driven member and the movement of said slide; a control means operatively associated with said drive train unit, means operatively associated with the driven member and with said control means and actuated by the shifting of the driven member by the stop means to operate said control means to effect after a predetermined time delay a reverse rotation of said driving member whereupon the driving member automatically causes axial shifting of the driven member to reestablish the driving connection between said members and causes said slide to move in the opposite direction.

MYRON S. CURTIS.

REFERENCES CITED

The following references are of record in the file of this patent:

UNITED STATES PATENTS

| Number | Name | Date |
| --- | --- | --- |
| 1,081,396 | Miller | Dec. 16, 1913 |
| 1,779,527 | Bayer | Oct. 28, 1930 |
| 2,054,018 | Gilchrist | Sept. 8, 1936 |
| 2,065,816 | Lovely et al. | Dec. 29, 1936 |
| 2,071,786 | Ferris et al. | Feb. 23, 1937 |
| 2,255,739 | Curtis | Sept. 9, 1941 |
| 2,289,957 | Godfriaux | July 14, 1942 |
| 2,348,657 | Silva et al. | May 9, 1944 |
| 2,351,687 | Lange | June 20, 1944 |
| 2,357,396 | Fuller | Sept. 5, 1944 |
| 2,384,809 | Bullard et al. | Sept. 18, 1945 |
| 2,405,686 | Clark | Aug. 13, 1946 |
| 2,419,704 | Bodmer | Apr. 29, 1947 |
| 2,424,153 | Curtis et al. | July 15, 1947 |
| 2,455,876 | Potter et al. | Dec. 7, 1948 |
| 2,562,266 | Gamble | July 31, 1951 |